United States Patent [19]

Cooper

[11] Patent Number: 5,509,220

[45] Date of Patent: Apr. 23, 1996

[54] TRACK TRENCHER PROPULSION SYSTEM AND PROCESS

[75] Inventor: Mark R. Cooper, Pella, Iowa

[73] Assignee: Vermeer Manufacturing Company, Pella, Iowa

[21] Appl. No.: 283,080

[22] Filed: Jul. 29, 1994

[51] Int. Cl.$^6$ .................................................. F16D 67/04
[52] U.S. Cl. .................. 37/348; 172/3; 180/6.7
[58] Field of Search .................. 37/91, 142.5, 348, 37/355, 362; 172/3, 4, 4.5; 180/6.2, 6.28, 6.32, 6.66, 6.7, 333; 405/175, 180, 181; 364/424.07

[56] References Cited

U.S. PATENT DOCUMENTS

| | | |
|---|---|---|
| Re. 34,576 | 4/1994 | Camilleri . |
| 3,876,020 | 4/1975 | Barsby .................. 180/333 X |
| 4,013,875 | 3/1977 | McGlynn . |
| 4,076,090 | 2/1978 | Krusche et al. . |
| 4,111,066 | 9/1978 | Kendrick . |
| 4,175,628 | 11/1979 | Cornell et al. .................. 180/333 X |
| 4,255,883 | 3/1981 | Ealy . |
| 4,301,910 | 11/1981 | Price . |
| 4,423,785 | 1/1984 | Kurihara et al. . |
| 4,541,497 | 9/1985 | Riediger et al. . |
| 4,677,579 | 6/1987 | Radomilovich . |
| 4,699,239 | 10/1987 | Ishino et al. .................. 180/6.7 X |
| 4,702,358 | 10/1987 | Mueller et al. .................. 180/6.7 X |
| 4,715,012 | 12/1987 | Mueller, Jr. . |
| 4,727,353 | 2/1988 | Ruhter . |
| 4,945,221 | 7/1990 | Nielsen et al. . |
| 5,065,320 | 11/1991 | Hayashi et al. . |
| 5,065,326 | 11/1991 | Sahm . |
| 5,088,020 | 2/1992 | Nishida et al. . |
| 5,101,919 | 4/1992 | Ossi . |
| 5,182,713 | 1/1993 | Kitoh . |
| 5,293,944 | 3/1994 | Matsumoto .................. 172/2 |
| 5,297,019 | 3/1994 | Zuehlke . |
| 5,297,649 | 3/1994 | Yamamoto et al. .................. 172/3 X |
| 5,325,933 | 7/1994 | Matsushita .................. 180/6.7 |
| 5,347,448 | 9/1994 | Nam . |
| 5,361,211 | 11/1994 | Lee et al. . |
| 5,363,304 | 11/1994 | Awano et al. . |
| 5,398,766 | 3/1995 | Nakayama et al. . |
| 5,424,623 | 6/1995 | Allen et al. . |

FOREIGN PATENT DOCUMENTS

| | | |
|---|---|---|
| 2700950 | 3/1978 | Germany . |
| 3070683 | 3/1991 | Japan . |
| WO94/02346 | 2/1994 | WIPO . |

OTHER PUBLICATIONS

Sauer–Sundstrand, Hydraulic Power System Technology manual, MCE101C Load Controller Specification, Feb. 1990, p. 1.

Sauer–Sundstrand, Hydraulic Power System Technology Manual, DC2 Microcontroller Specification, Mar. 1993, p. 1.

*Primary Examiner*—Terry Lee Melius
*Assistant Examiner*—Robert Pezzuto
*Attorney, Agent, or Firm*—Merchant, Gould, Smith, Edell, Welter & Schmidt

[57] ABSTRACT

A system and process for controlling propulsion of a track trencher excavation machine includes a multiple mode propulsion control that performs a plurality of functions depending on a selection of one of a plurality of operational modes. A computer modifies the functions of the multiple mode propulsion control depending on a selected operational mode, and coordinates propulsion of the engine and track drives of a track trencher in response to signals produced by the propulsion control.

22 Claims, 27 Drawing Sheets

FIG. 18

STATUS MESSAGES

| CHAIN | Trans. LO | TURN |
|---|---|---|
| 0% | 98 FPM | 10L |

— 210

| CHAIN | TRENCH LO | TURN |
|---|---|---|
| 72% | 1.3 FPM | 0 |

— 211

| ERPM | HOURS | BATTERY |
|---|---|---|
| 2200 | 332.1 | 12.2V |

— 212

FAULT MESSAGES

FAULT: THROTTLE SNSR
3.30V — 213

FAULT: L. TRACK PPU
LOST SIGNAL — 214

FAULT: OIL PRESSURE
TOO LOW — 215

FAULT: WATER TEMP.
TOO HIGH — 216

WARNING! Engine Will
Shutdown in 30 sec. — 217

TRACK TRENCHER PROPULSION SYSTEM AND PROCESS

FIELD OF THE INVENTION

The present invention relates generally to the field of excavation and, more particularly, to a multiple operational mode propulsion control, and a system and process for controlling propulsion of a track trencher.

BACKGROUND OF THE INVENTION

A track trencher excavation machine, shown in FIGS. 1 and 2, typically includes an engine 36 coupled to a right track drive 32 and a left track drive 34 which together comprise the tractor portion 45 of the track trencher 30. An attachment 46, usually coupled to the front of the tractor portion 45, typically performs a specific type of excavating operation.

A ditcher chain 50 is often employed to dig relatively large trenches at an appreciable rate. The ditcher chain 50 generally remains above the ground in a transport configuration 56 when maneuvering the trencher 30 around the work site. During excavation, the ditcher chain 50 is lowered, penetrates the ground, and excavates a trench at the desired depth and speed while in a trenching configuration 58. Another popular trenching attachment is termed a rock wheel in the art, shown in FIG. 3, and may be controlled in a manner similar to that of the ditcher chain 50.

Controlling a track trencher 30 using a prior art control scheme generally requires an operator to manipulate various levers, switches, and knobs in order to operate the track trencher 30 both safely and efficiently. A high degree of skill is typically required on the part of the operator who must continuously monitor and adjust the propulsion and steering of the tractor portion 45, as well as the operation of the attachment 46, when operating the track trencher 30 in one or more travel modes, including particularly a trench mode and a transport mode. Maintaining optimum track trencher performance using prior art propulsion and steering controls during both excavation and transport is generally considered an exacting and fatiguing task.

FIG. 4 is an illustration of a conventional control panel 62 of a track trencher 30. Propulsion and steering of a track trencher 30 when operating in a transport mode is generally controlled by manipulating the left and right track levers 64 and 66 which respectively control actuation of the left and right track drives 34 and 32. Moving the right track lever 66 forward, for example, generally causes the right track drive 32 to operate in a forward direction and, depending on the relative velocity of the left track drive 34, steers the track trencher 30 to move in either a left or right direction. Reversing the right track drive 32 is generally accomplished by pulling the right track lever 66 backwards, thereby causing the right track drive 32 to operate in a reverse direction.

Propulsion of the left track drive 34 is accomplished in substantially the same manner as that previously described with regard to the right track drive 32. Thus, both propulsion and steering are controlled by the prior art track levers 64 and 66 of a track trencher 30. Moreover, propulsion and steering control of the right track drive 32 is completely independent from that of the left track drive 34.

It is often desirable to maintain the engine 36 at a constant, optimum output level during excavation which, in turn, allows the trenching attachment 46 to operate at an optimum trenching output level. The prior art control panel shown in FIG. 4 includes a plurality of controls and switches, including a speed range switch 74, RPM knob 76, steering trim knob 78, and propel trim knob 80. All of these switches and knobs must typically be adjusted during normal trenching operation to maintain the engine at the desired engine output level when encountering variable attachment 46 loading, and to steer the track trencher 30 in a desired direction. Additionally, the right and left pump potentiometers 84 and 82 typically require adjustment and readjustment to equilibrate the operational characteristics of the left and right pumps 38 and 40.

The speed range switch 74, for example, is typically adjustable between a low, medium, and high switch setting. The particular speed range setting is generally determined by a number of factors during excavation, including the desired trenching speed and the type of soil being subject to excavation. A high speed range switch 74 setting is generally appropriate for trenching through softer soil, whereby the track trencher 30 will typically operate at a relatively high speed due to a relatively low level of loading on the trenching attachment 46. Upon encountering more compacted soil, such as concrete, the loading on the trenching attachment 46, typically powered by the engine 36, will increase, thereby resulting in a corresponding reduction in the speed of the track trencher 30.

The operator must generally react quickly to such changes in engine 36 loading typically by first determining the appropriate switch to adjust, and then the degree of switch adjustment. Typically, minor propulsion modifications are made by adjusting the propel trim knob 80. Moderate changes to the propulsion level of the track trencher 30 are effectuated by adjusting the RPM knob 76. A major modification to the propulsion level of the track trencher 30 is typically accomplished by switching the speed range switch 74 from a high setting to either a medium or low setting, and once again adjusting the propel trim knob 80 and RPM knob 76 in order to avoid stalling out the engine 36.

A track trencher excavation machine typically employs one or more sensors that monitor various physical parameters of the machine. The information gathered from the sensors is generally used to moderate a particular machine function, or to provide the operator with information typically by transducing a sensor signal for communication to one or more analog display instruments, such as a tachometer 72, for example. The information communicated to an operator by employing a plurality of analog display instruments must generally be interpreted by a skilled operator in order to assess whether the track trencher is operating within acceptable performance and safety margins.

There is a desire among the manufacturers of track trenchers to minimize the difficulty of operating a track trencher both in a transport mode and, more particularly, in a trench mode. There exists a further desire to reduce the substantial amount of time currently required to adequately train a track trencher operator. Additionally, there continues to exist in the excavation equipment manufacturing community a keenly felt need to enhance the means of communicating operational, diagnostic, and safety-related information to the operator during track trencher operation. The present invention fulfills these needs.

SUMMARY OF THE INVENTION

The present invention is a propulsion control system and process for operating a track trencher comprising a multiple mode propel control that functions in a plurality of opera-

BRIEF DESCRIPTION OF THE DRAWINGS

FIG. 18 illustrates examples of various status and fault messages communicated to the operator of a track trencher over a display;

DETAILED DESCRIPTION OF THE PREFERRED EMBODIMENTS

The present invention, as previously indicated, relates to a propulsion control system and process for controlling propulsion of a track trencher. The present application describes the entire system and process for controlling propulsion and steering, and communicating to an operator the operational status of a track trencher in order to permit a complete appreciation of the various functions and activities within the system. As such, there are described in the present application various features and functions of the track trencher propulsion and steering control system which are not the subject of the present invention, but are the subject of inventions claimed in co-pending applications file concurrently with this application. The description of these features and functions are included in the present application for completeness and to permit a full appreciation of the operation of the track trencher propulsion and steering control system disclosed herein.

Figure 1:
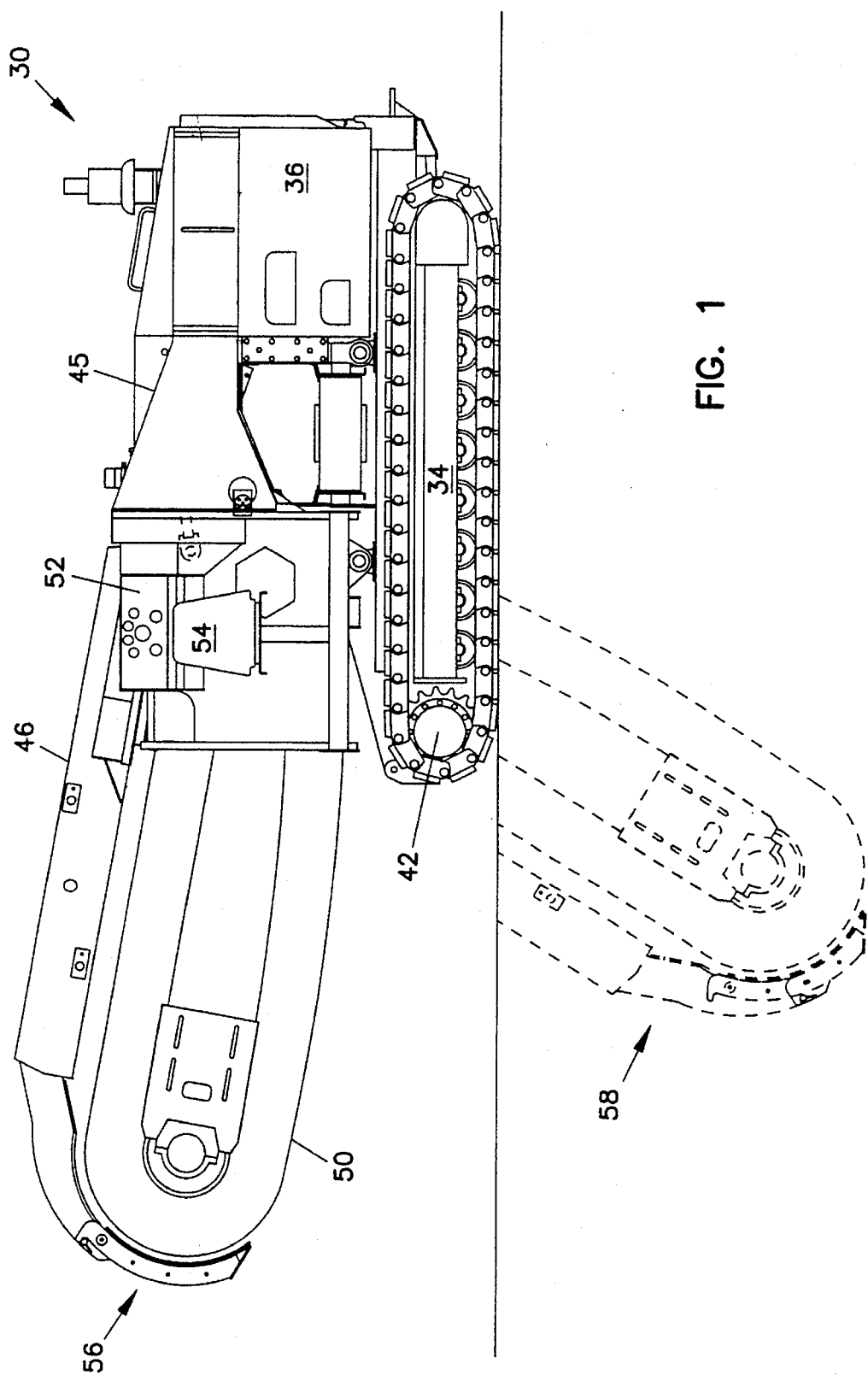
FIG. 1 is a side view of a track trencher, including a ditcher chain trenching attachment.
Figure 2:
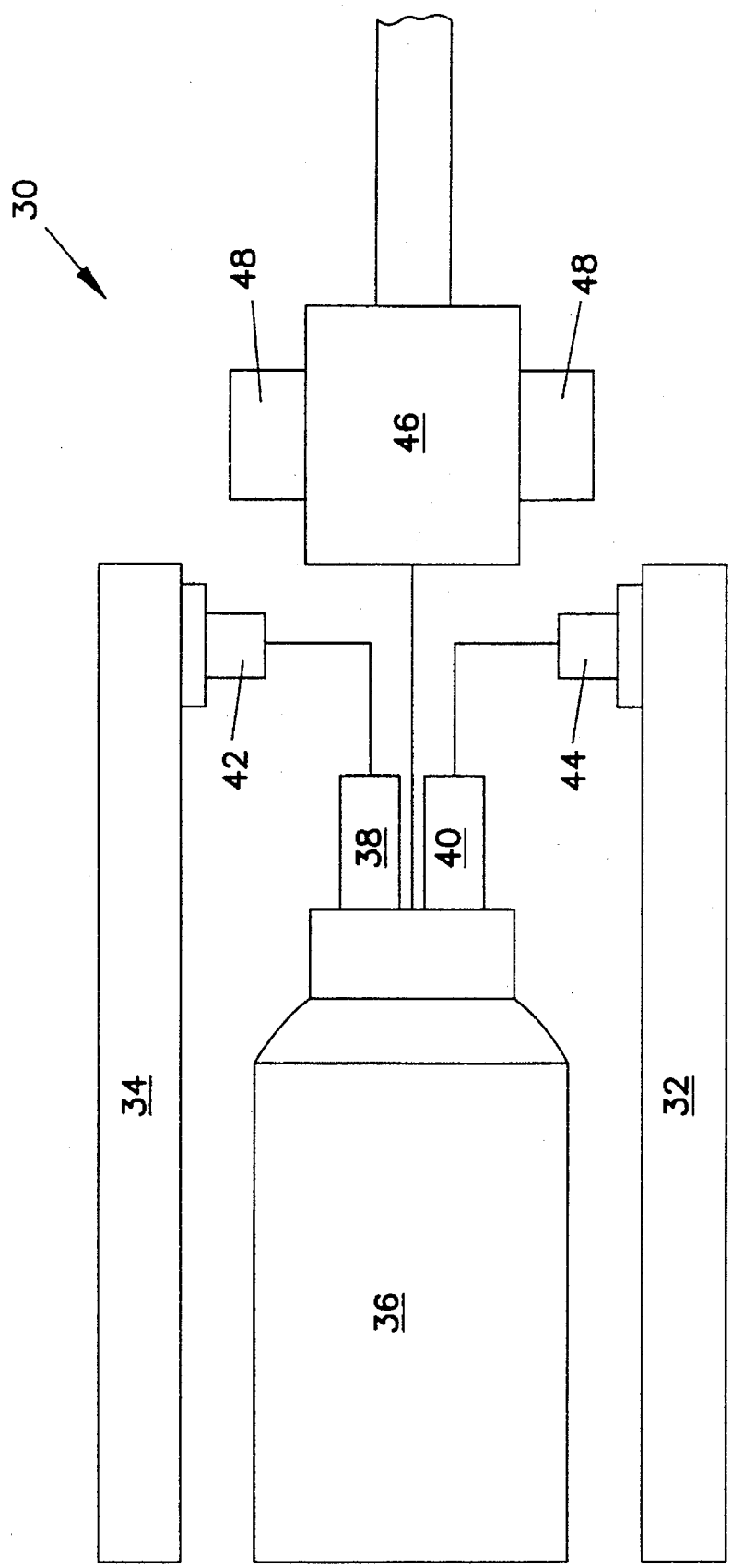
FIG. 2 is a generalized top view of a track trencher.
Figure 3:
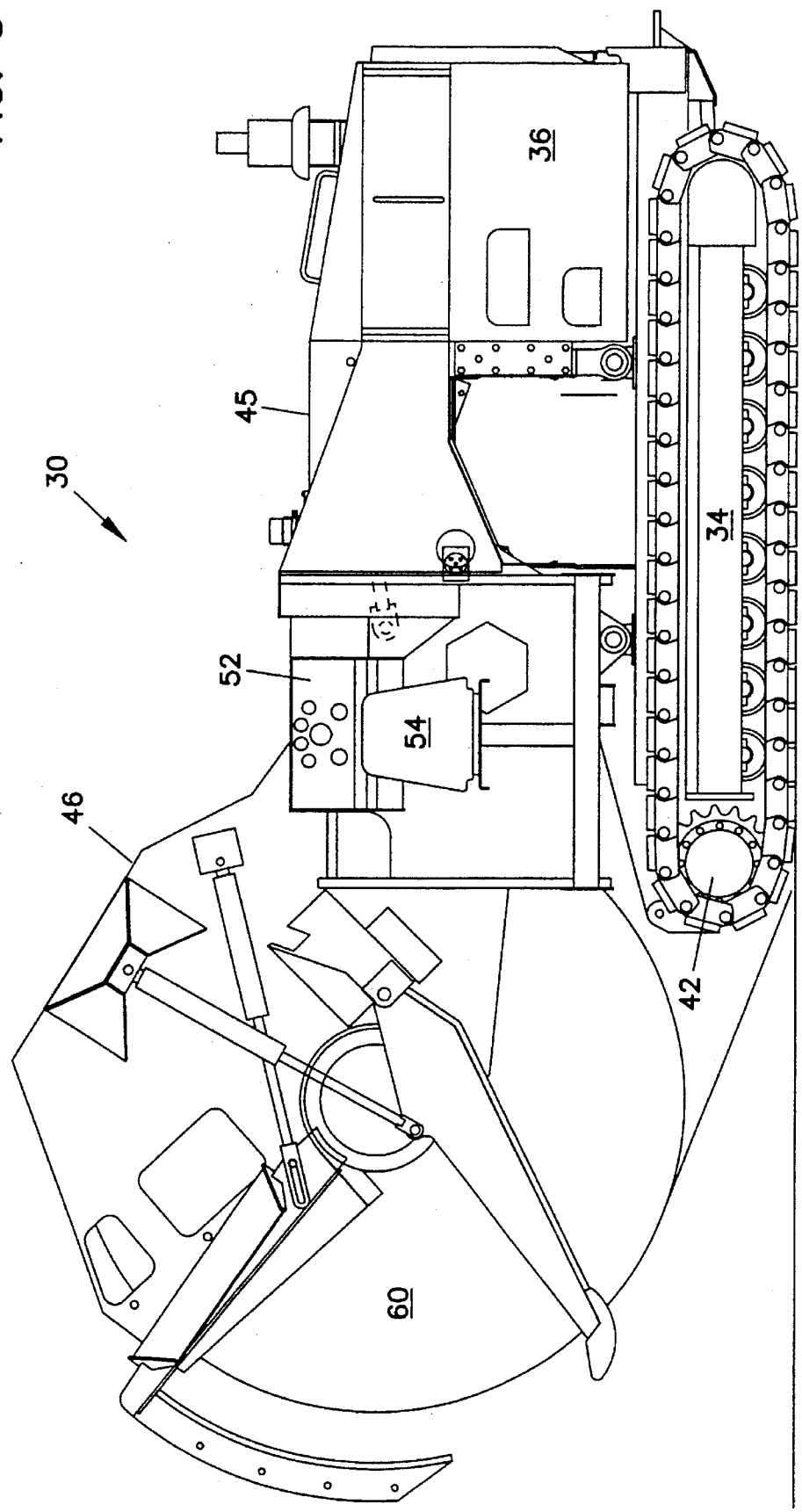
FIG. 3 is a side view of a track trencher with a rock wheel trenching attachment coupled thereto.
Figure 4:
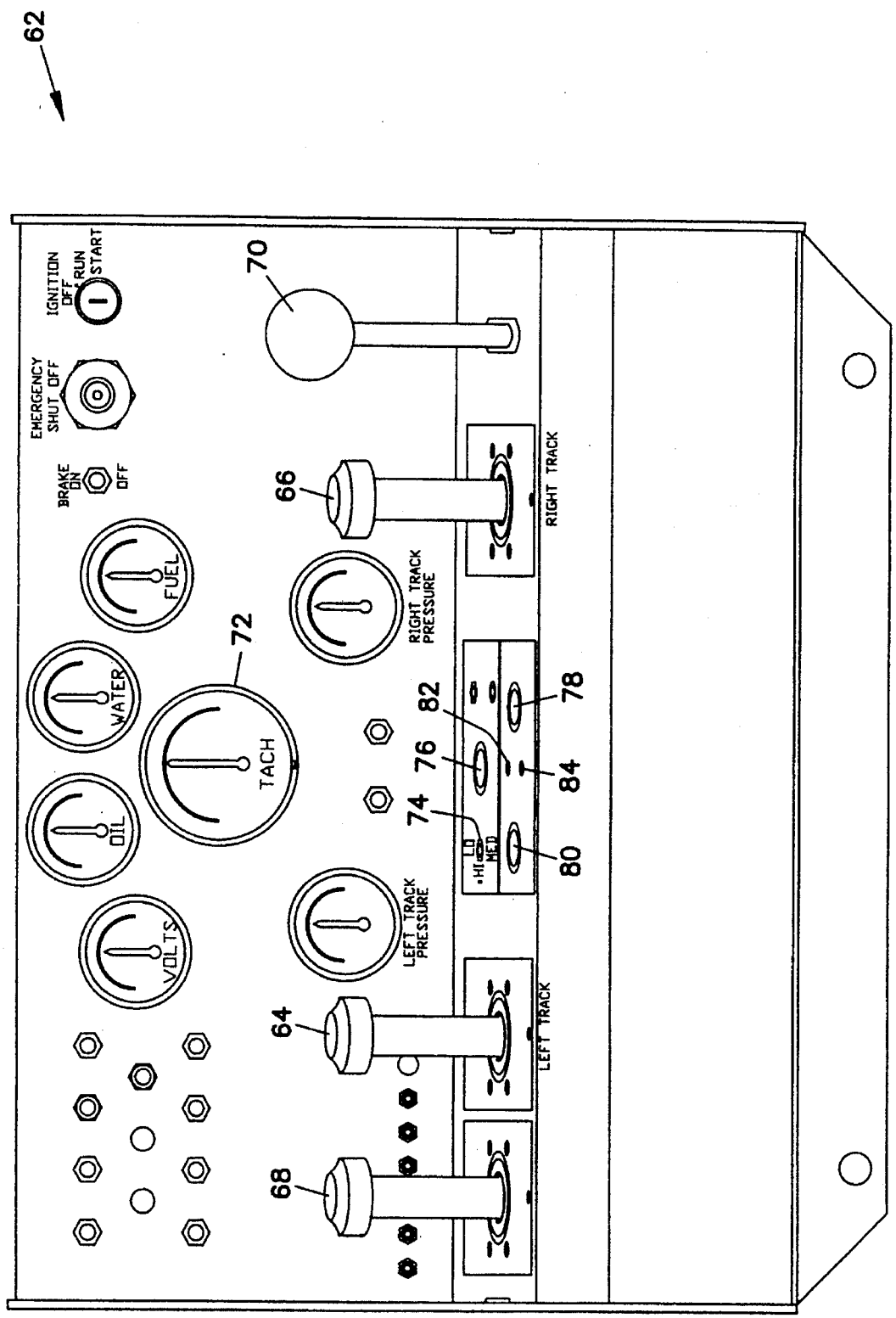
FIG. 4 is an illustration of a prior art control panel for controlling a track trencher.
Figures 5, 6:
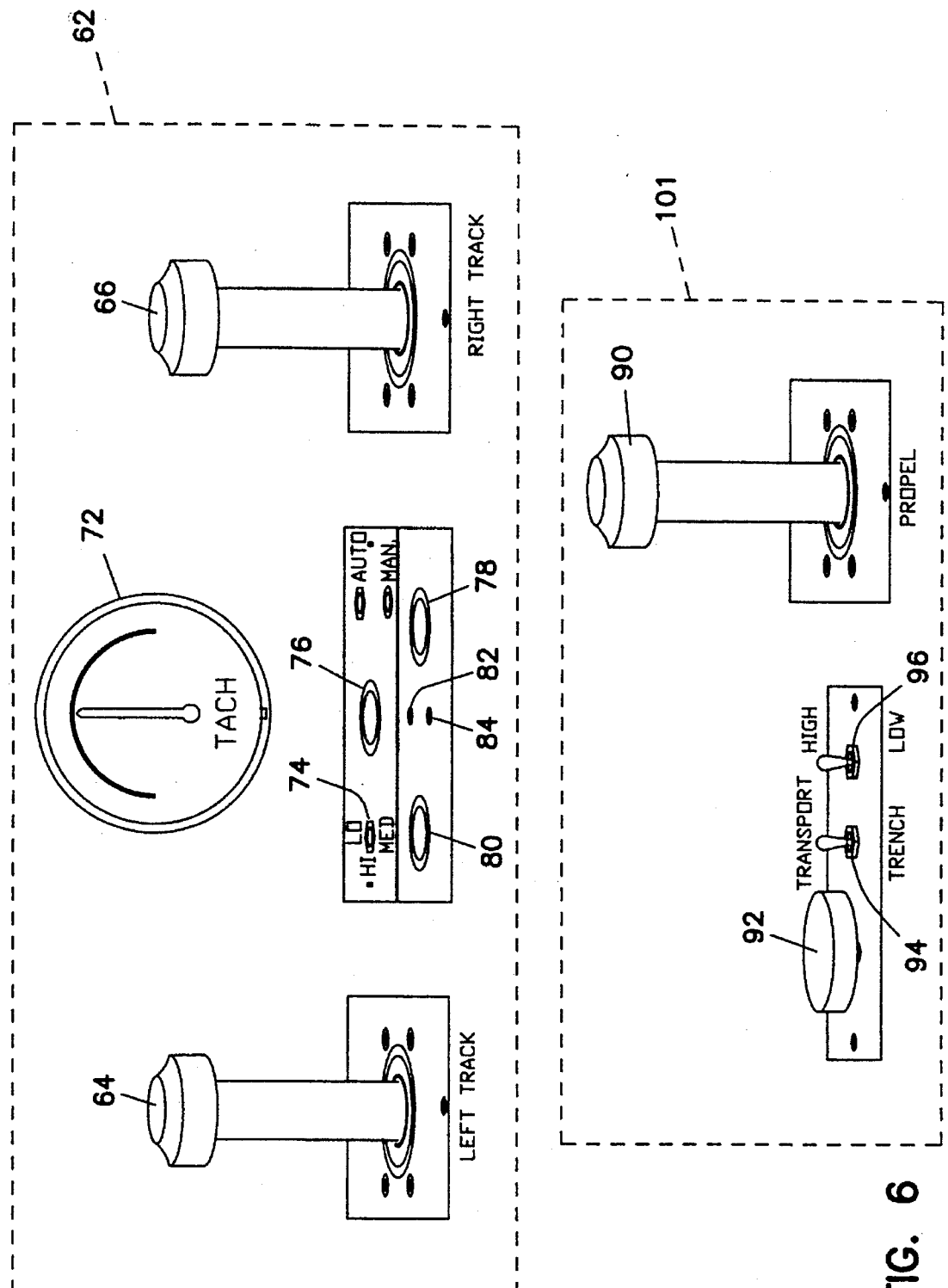
FIG. 5 is a fragmentary view of a prior art control panel illustrating the levers and controls required to operate a conventional track trencher.
FIG. 6 is a fragmentary view of a track trencher control panel incorporating a novel multiple mode propel control and multiple mode steering control.

Referring now to the figures, and more particularly to FIG. 6, there is shown a control panel 101 including novel multiple mode propel and steering controls 90 and 92 for operating a track trencher 30. In one embodiment, the propel control 90, steering control 92, and travel mode control 94 operate in combination to effectively propel and steer a track trencher 30 in one of a plurality of travel modes. The propel control 90 and steering control 92 are preferably multiple mode controls, with each control 90 and 92 performing a plurality of functions depending on a selected travel mode.

Comparing the novel control panel shown in FIG. 6 to a prior art control panel as shown in FIG. 5, it is readily apparent that the multiple mode propel and steering controls 90 and 92 illustrated in FIG. 6 provide for a substantial reduction in the number of control levers, switches, and trimming knobs otherwise required to operate a track trencher 30 employing a prior art control scheme. Most noticeably, the two prior art track drive levers 64 and 66 have been eliminated, as well as a tachometer 72 which is typically required to monitor the effects of control adjustments on the output level of the engine 36. Moreover, many of the functions associated with the speed range switch 74, RPM knob 76, steering trim knob 78, and propel trim knob 80 of a prior art control panel 62, as shown in FIG. 5, are either eliminated or integrated into the functions performed by the unique multiple mode propel and controls 90 and 92 illustrated in FIG. 6. It is noted that the prior art left track lever 64 and right track lever 66 control both steering and propulsion of a track trencher 30. It is further noted that the prior art left track lever 64 typically controls the actuation of the left track drive 34, while the right track lever 66 controls the actuation of the right track drive 32. As such, control of the left track drive 34 is wholly independent from that of the right track drive 32.

Figure 7:
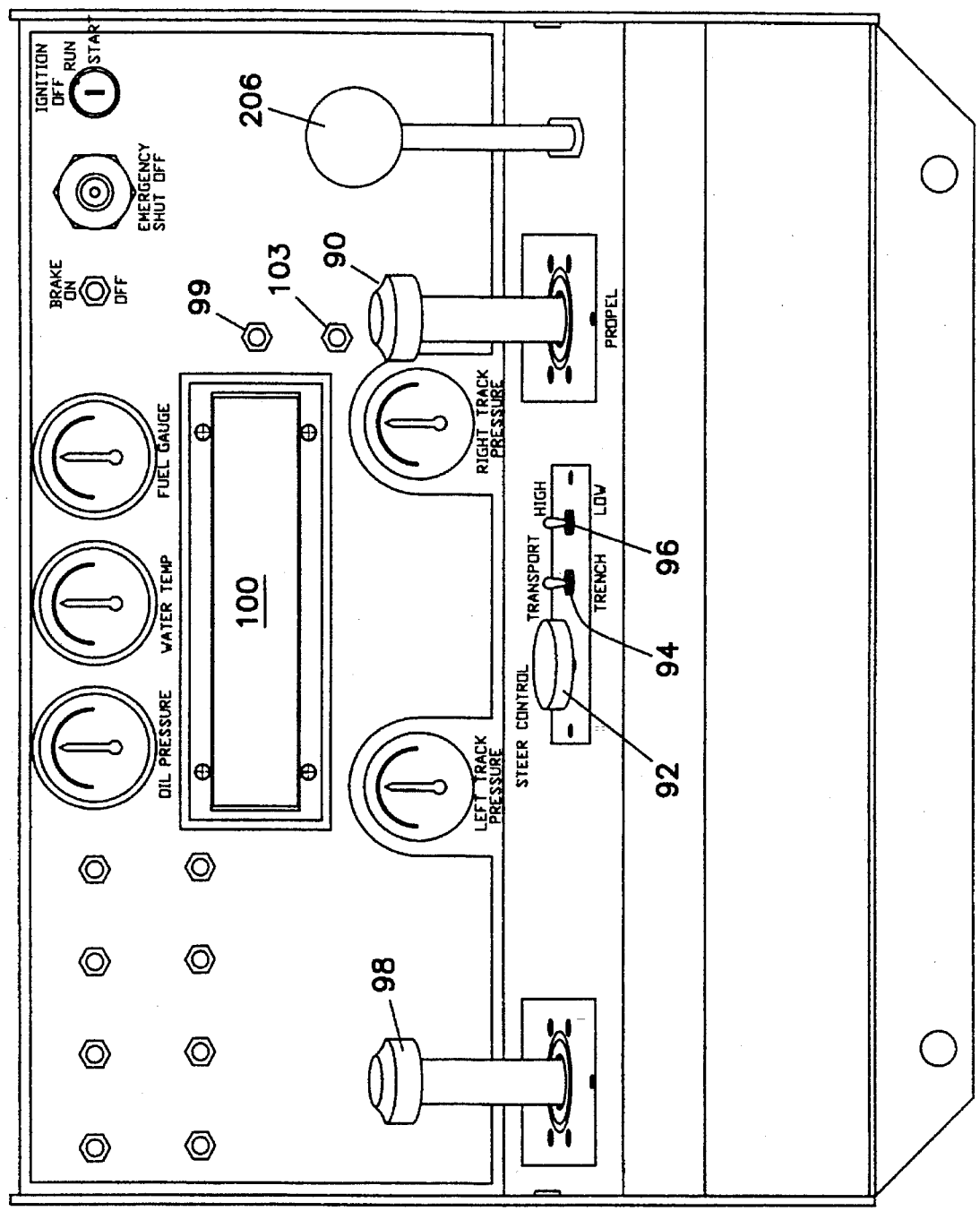
FIG. 7 is a full view of a track trencher control panel incorporating multiple mode propel and steering controls and a display.

One important advantage of the novel control scheme illustrated in FIGS. 6 and 7 concerns the effective uncoupling, or separating, of the steering control functions from the propulsion control functions for controlling a track trencher 30. Propulsion of the left and right track drives 34 and 32 is controlled by the propel control 90, while steering of a track trencher 30 is independently controlled by the steering control 92. Controlling a track trencher 30 while operating in any one of a plurality of travel modes is substantially simplified by employing the multiple mode propel and steering controls 90 and 92.

Figure 8:
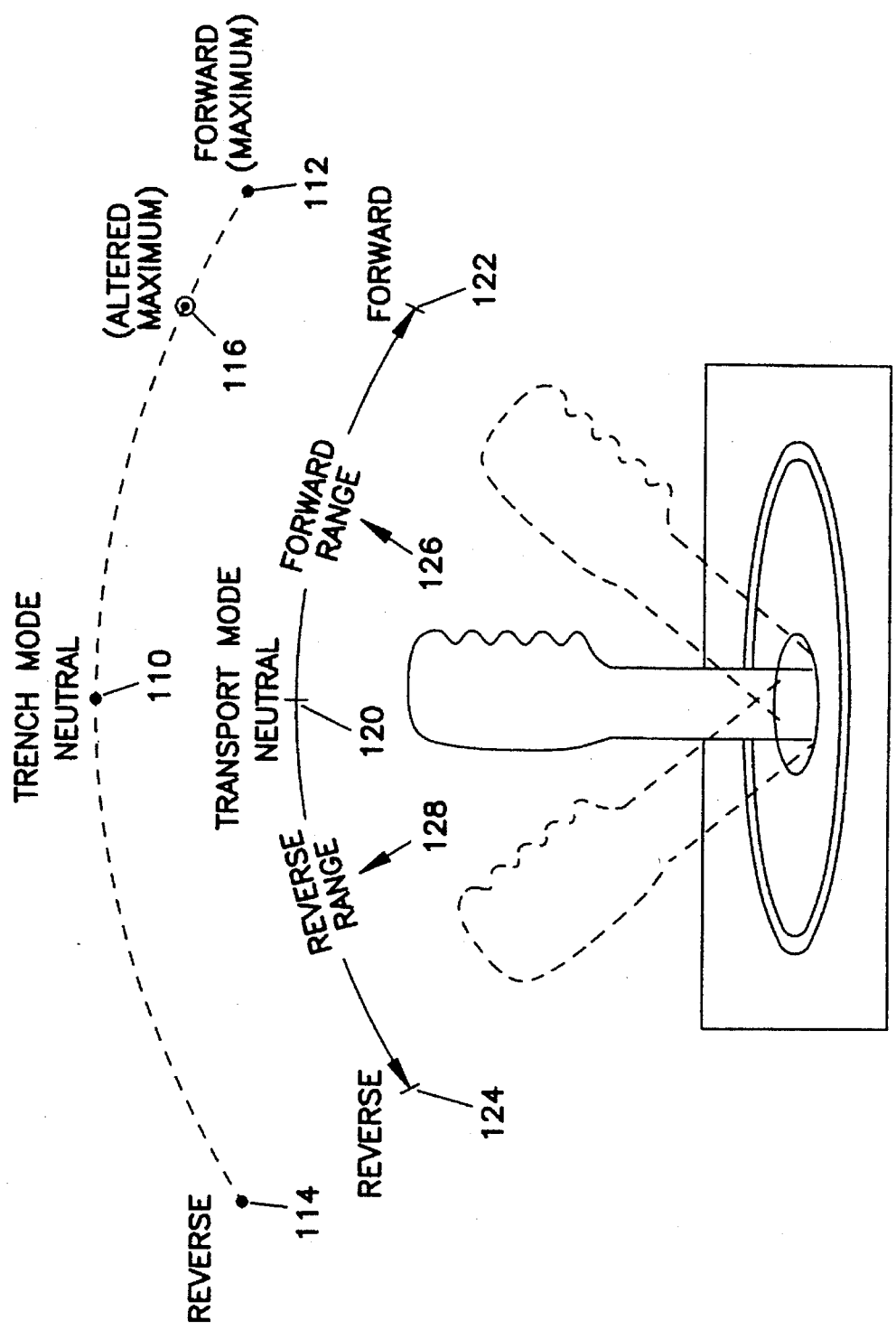
FIG. 8 is an illustration of a multiple mode propel control and associated functions when operating a track trencher in a trench mode and a transport mode.

Referring now to FIG. 8, there is shown a multiple mode propel control 90 for controlling propulsion of a track trencher 30 in one of a plurality of travel modes. By use of the term "multiple mode," it is meant that a particular control performs a plurality of distinct functions depending on a particular selected mode of operation. As such, a plurality of control tasks, heretofore executed manually by an operator of a track trencher 30, are instead performed by a single multiple mode control, such as the propel and steering controls 90 and 92 shown in FIG. 8, which would otherwise be performed by manipulating a multiplicity of control levers, switches, and trimming knobs, as previously discussed.

The propel control 90 shown in FIG. 8 has a neutral setting, a maximum forward setting, a maximum reverse setting, and a range of forward and reverse settings. By way of illustration, and not of limitation, the multiple mode propel control 90 is preferably operable in a transport mode and a trench mode, it being understood that travel modes other than a transport and trench mode may be selectably available. Selection of a transport mode or a trench mode of operation is preferably determined by the state of a travel mode control 94, which alters the functionality of the propel control 90.

Figure 19:
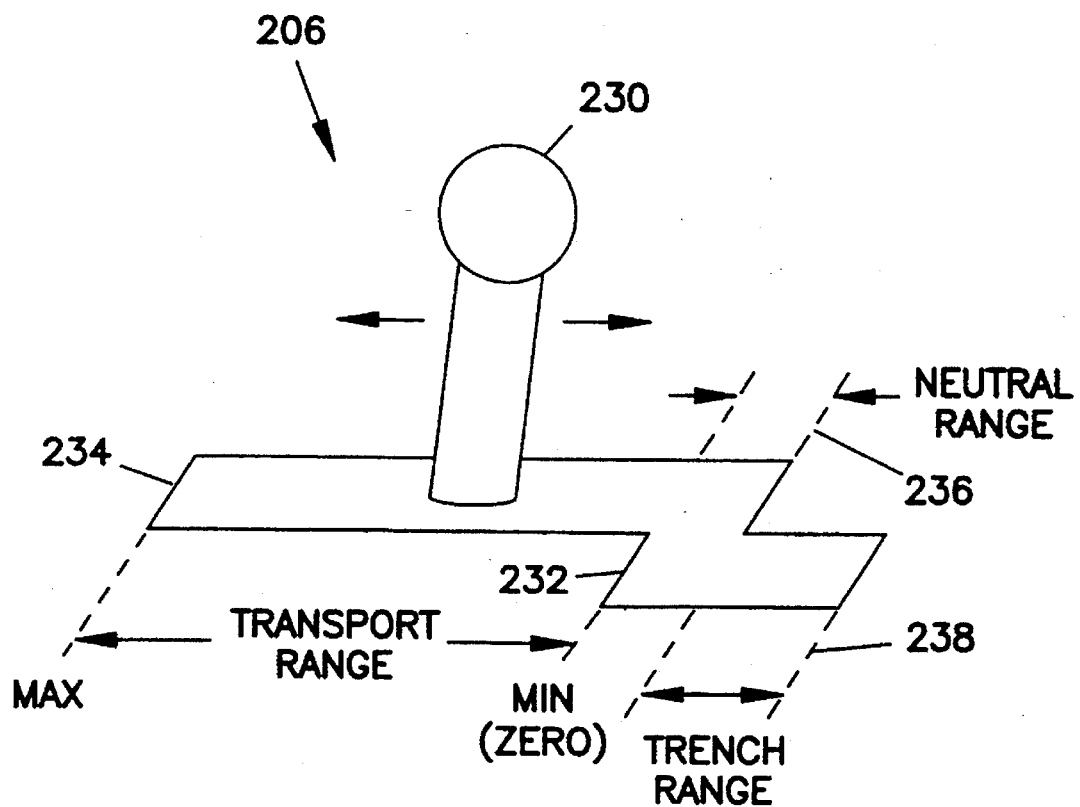
FIG. 19 is an illustration of a novel multiple mode throttle control.

In another embodiment, manual selection of a travel mode using a travel mode control 94 is eliminated. Transitioning to and from a trench mode and a transport mode may be accomplished by sensing the position of the throttle 206 of the engine 36. In the embodiment shown in FIG. 19, the throttle control 206 is operable in a transport range defined by a minimum throttle position 232 and a maximum throttle position 234. Operating the throttle control 206 within the transport range is interpreted by the computer 182 as a selection of the transport travel mode.

Moving the throttle control 206 into the neutral range 236 is interpreted by the computer 182 as requesting a transition out of the transport or trench travel modes. Moving the throttle control 206 into the trench mode range 238 effectively transitions the travel mode to the trench mode. The trench mode is deselected by moving the throttle control 206 back from the trench mode range 238 into the neutral range 236. The transport mode may then be selected by moving the throttle control 206 back to the minimum throttle position 232. It will be appreciated that the throttle control 206 configuration illustrated in FIG. 19 requires the operator to overtly change the positioning of the throttle control 206 when transitioning between travel modes, thereby decreasing the probability of selecting an unintended travel mode.

In another embodiment, the throttle 206 includes a sensor coupled to the engine 36 which monitors the fuel being delivered to the engine 36. The fuel control 204 preferably includes means for regulating the volume of fuel delivered to the engine 36. A throttle sensor may be coupled to the fuel regulator and communicates the status of the fuel regulator to the computer 182. A maximum throttle control 206 setting, indicated by throttle lever 230 being set to a maximum throttle position, is interpreted by the computer 182 as a selection of the trench mode of operation. Throttle control 206 settings other than a maximum throttle control position is interpreted by the computer 182 as a selection of a transport mode of operation. It is noted that the throttle control 206 illustrated in FIG. 19 need not have separate transport and trench ranges. A single range of throttle control 206 settings may be appropriate, with a maximum throttle control setting being provided to transition the track trencher 30 between a transport mode and a trench mode of operation.

In an alternative embodiment, the status of the attachment 46 is sensed and used as a basis for determined whether the transport mode or trench mode is to be selected. An attachment sensor 186 preferably produces an attachment sense signal indicative of the operational status of the attachment 46. The computer 182 preferably interprets attachment 46 activity as a selection of the trench travel mode, and attachment 46 inactivity as a selection of the transport travel mode.

In one embodiment illustrated in FIG. 8, operating a track trencher 30 in a transport mode is preferably accomplished by setting the travel mode control 94 to a transport mode setting. The propulsion, forward and reverse of a track trencher 30 is preferably dependent on the positioning of the propel control 90 between a forward and reverse maximum setting 122 and 124. The propel control 90 produces a transport propel signal that is preferably proportional to the displacement of the propel control 90 in either the forward or reverse direction with respect to a neutral setting 120.

Further, the transport propel signal is preferably representative of a target track motor speed measured in revolutions-per-minute.

A neutral setting 120 is preferably associated with an idle state, whereby no power is delivered to the left and right track drives 34 and 32. As the propel control 90 is moved in the forward direction, increasing power is proportionally transferred from the engine 36 to the left and right track motors 42 and 44. A forward range 126 of propel control 90 settings is defined between a neutral setting 120 and a maximum forward setting 122, with forward power being delivered to the left and right track motors 42 and 44 in proportion to the forward displacement of the propel control 90 within the forward range of settings 126. Similarly, a range of reverse settings 128 is defined between the neutral setting 120 and a maximum reverse setting 124. Power is preferably applied to the left and right track motors 42 and 44 in a reverse direction in proportion to the displacement of propel control 90 within the reverse range of settings 128.

In another embodiment, setting the travel mode control 94 to a trench mode setting causes the multiple mode propel control 90 to function in a trench mode. Operating the track trencher 30 in a trench mode typically begins by setting the propel control 90 to a neutral setting 110. The operator preferably then moves the propel control 90 to a maximum forward setting 112. At the maximum forward setting 112, the propel control 90 produces a trench propel signal which is preferably representative of a target engine output level, or speed, measured in revolutions-per-minute.

As discussed previously, it is generally desirable to maintain the engine 36 at a constant output level during excavation in a trench mode which, in turn, allows the trenching attachment 46 to operate at an optimum trenching output level. Controlling a track trencher 30 during excavation by employing a multiple mode propel control 90 shown in FIG. 8 virtually eliminates the need for the operator to make any further adjustments to the propel control 90 in order to maintain the engine 36 at a target engine output level. Rather, in response to a trench mode signal produced by the propel control 90 when set to a maximum forward setting 112, the propulsion levels of the left and right track motors 42 and 44 are automatically modified by a computer 182, shown in FIG. 17 and discussed in detail hereinafter, in order to maintain the engine 36 at the target output level.

It may be desirable to modify the rate of excavation or, more specifically, the loading on the engine 36 when operating a track trencher 30 in a trench mode. Another advantage of employing the multiple mode propel control 90 concerns the ability to modify the actual or the effective maximum forward setting 112 of the propel control 90 during operation of the track trencher 30. A new or adjusted actual maximum forward setting is established by moving the propel control 90 to a new maximum forward setting 116 after toggling a reset switch 103, as shown in FIG. 7. Establishing a new or altered forward maximum setting 116 effectively results in the propel control 90 producing a trench propel signal representative of a new target engine output level when the propel control 90 is set to the new altered maximum setting 112 during excavation. After selecting a new maximum forward setting 116, the reset switch 103 may be toggled back to its original position, and trenching may resume.

A new or adjusted target engine output level may alternatively be established by employing a unique user interface provided in part by the display 100. Effective adjustment of the maximum forward setting 112 is preferably accomplished by selecting a partial re-calibration menu for presentation on the display 100. The partial re-calibration menu is preferably selected by actuation of the message selection switch 99. An operator typically moves the propel control 90 from the original maximum forward setting 112 to a neutral setting 120, and selects the partial re-calibration menu for presentation on the display 100 using the message selection switch 99. The original target engine output level will preferably then be displayed on the display 100. Depressing a re-calibration switch (not shown) preferably increases or decrease the value of the target engine output level to a new or adjusted target engine output level. De-selection of the re-calibration switch preferably results in replacing the original target engine output level stored in the computer 182 with the new or adjusted target engine output level. The operator may then move the propel control 90 from the neutral setting 120 to the original maximum forward setting 112 to operate the engine at the new or adjusted target engine output level. Thus, the maximum forward setting 112 is effectively adjusted during a partial re-calibration procedure to operate the track trencher 30 at a new or adjusted target engine output level during excavation. In a preferred embodiment, an operator may select a new or adjusted target engine output level, measured in revolutions-per-minute, that is 100 RPM greater than or less than the original target engine output level, and preferably in increments of 25 RPM.

Figure 11:
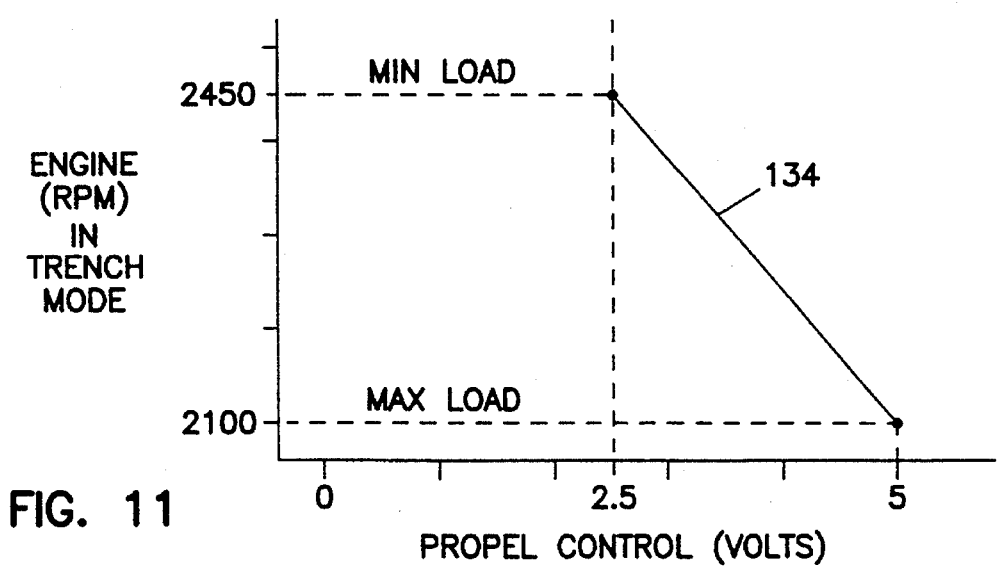
FIG. 11 is a graph illustrating a productive range of target engine output levels associated with a partial re-calibration procedure during trenching operation.

In another embodiment, the target engine output level, when operating a track trencher 30 in the trench mode, is modifiable on-the-fly during excavation. The relationship between the output voltage signal of the propel control 90 to a range of target output levels of the engine 36 is illustrated in FIG. 11. The engine load line 134 represents a spectrum of productive target engine output levels for a particular track trencher engine when operating in a trench mode. Adjusting the propel control 90 to a new forward maximum setting 116 during excavation causes the propel control 90 to produce a trench propel signal that results in an automatic readjustment of the target engine output level in accordance with the engine load line 134.

A preferred target engine output level is generally associated with the speed at which the engine 36 of a track trencher 30 produces maximum horsepower, although other engine output levels may be appropriate. Depending on the particular engine characteristics of the track trencher 30, the range of optimum engine speeds will differ. An example of a typical range of productive target engine output levels for a track trencher 30 is provided for illustrative purposes in FIG. 11.

In further reference to the engine load line 134, the engine 36, for example, may be operated productively within a range of target engine output levels between 2,100 RPM to 2,450 RPM. At 2,100 RPM, the engine 36 is considered to be heavily loaded and, in turn, generates maximum horsepower, as well as maximum stress on the engine 30. At 2,450 RPM, loading of the engine 36 is considered minimal, thus generating minimum horsepower with respect to the range of productive target engine output levels. Manual or on-the-fly adjustment of the target engine output level to a new target engine output level in response to a trench propel signal produced by the propel control 90 is preferably accomplished by adjusting the propel control 90 to a new or altered actual or effective maximum forward setting 116 between the neutral setting 110 and the previously established maximum forward setting 112. A track trencher 30 operator, as discussed previously, need not make any further adjustments to the propel control 90 after selecting a new forward maximum setting when excavating in a trench mode.

Figure 9:
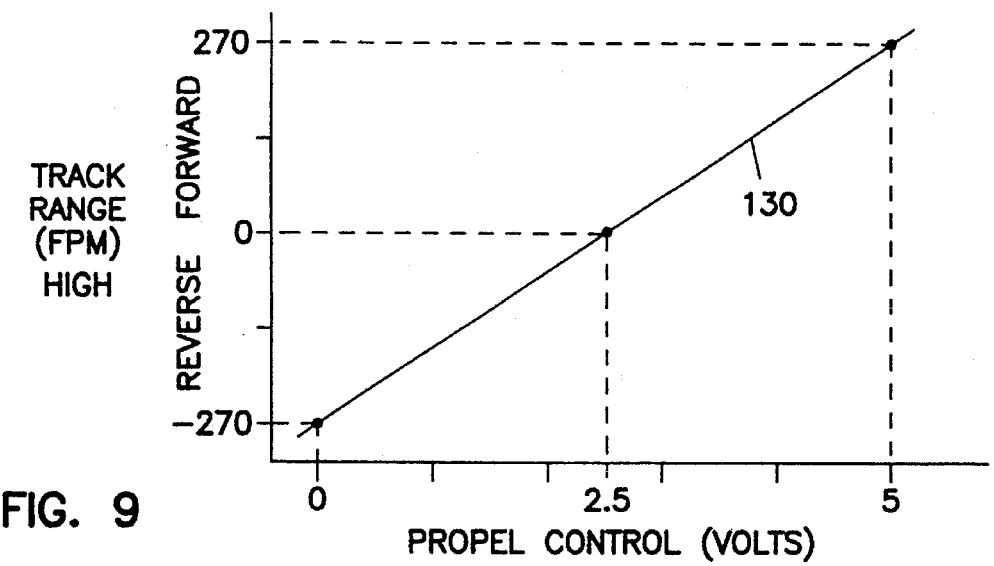
FIG. 9 is a graph illustrating the output level of the left and right track drives of a track trencher in response to propel control output voltage signals when a speed range control is set to a high setting.
Figure 10:
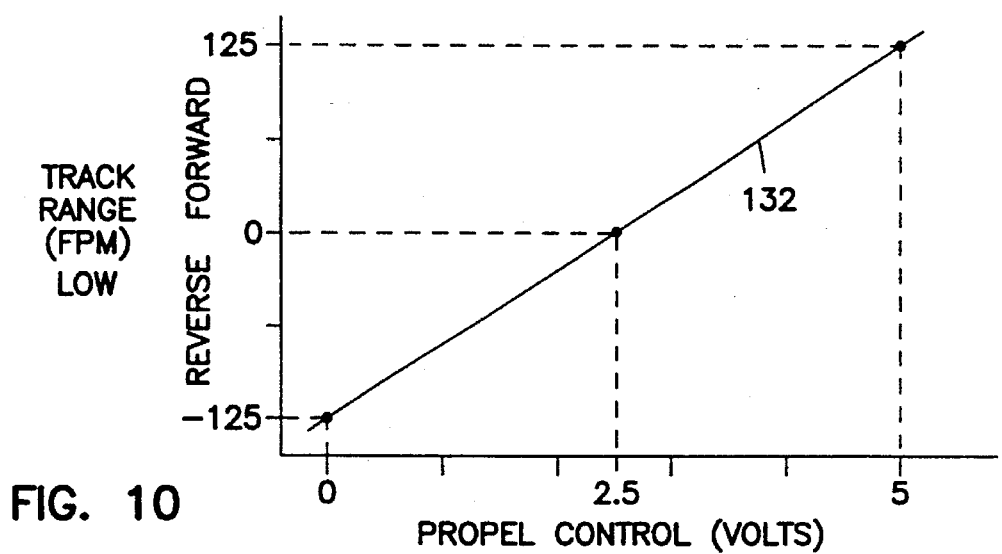
FIG. 10 is a graph illustrating the output level of the left and right track drives of a track trencher in response to propel control output voltage signals when a speed range control is set to a low setting.

An important advantage of operating a track trencher 30 using a multiple mode propel control 90 concerns additional functionality provided by a speed range control 96, preferably having a high setting and a low setting. Turning now to FIGS. 9 and 10, there is shown two graphs illustrating a preferred relationship between the output of the propel control 90 and the response of the left and right track drives 34 and 32. The graph of FIG. 9 illustrates a relationship between the magnitude of the left and right track drive 34 and 32 velocity, measured in feet-per-minute (FPM), in response to a selected propel control 90 setting when the speed range control 96 is set to a high setting. FIG. 10 illustrates a similar relationship when the speed range control 96 is set to a low setting.

The propel control 90 preferably produces a range of output voltage signals between zero and 5.0 volts. A propel control 90 output voltage signal of 2.5 volts is preferably associated with a neutral setting, wherein no power is delivered to the left and right track motors 42 and 44. Forward propulsion is accomplished by moving the propel control 90 in the forward direction, resulting in forward power being delivered to the track motors 42 and 44. As shown in FIG. 9, a propel control 90 output voltage signal of 5.0 volts typically is associated with a maximum forward track drive velocity, while an output voltage signal of zero volts typically is associated with a maximum reverse track drive velocity. In one embodiment, the magnitude of the maximum forward and reverse track drive velocities are 270 FPM when the high range setting of the speed range control 96 is selected, and 125 FPM when the low range is selected. Alternatively, a track trencher 30 may be operable in only a single speed range. It will be understood that speed ranges other than high and low come within the scope of the propulsion control system invention.

Figure 12:
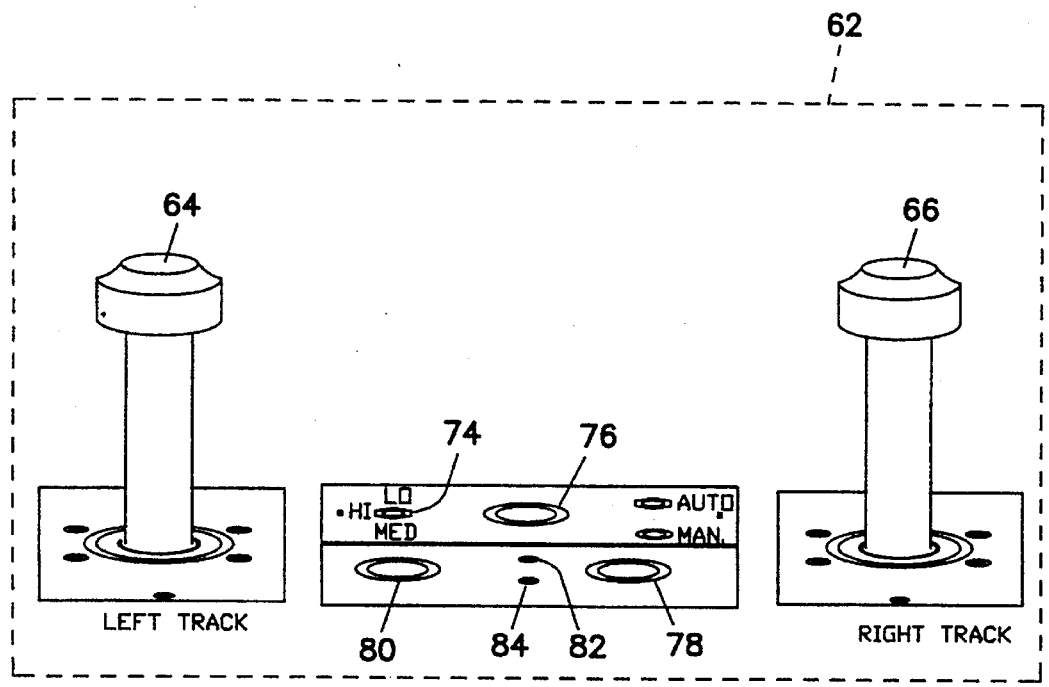
FIG. 12 is an illustration of a prior art steering control apparatus comprising independent left and right track levers.

The multiple mode steering control 92 provides additional advantages when operating a track trencher 30 in one of a plurality of travel mode. The steering control 92 shown in FIG. 13 effectively integrates into a single control the steering functions performed by the two independent track levers 64 and 66, steering trim knob 78, and left and right pump potentiometers 82 and 84 of a prior art control scheme shown in FIG. 12. Steering a track trencher 30 is typically accomplished by operating the left and right track drives 34 and 32 at different velocities. For example, a prior art steering control system typically accomplishes left turning by increasing the velocity of the right track drive 32, while maintaining or decreasing the velocity of the left track drive 34. An operator of a track trencher 30 must modify the relative velocities of the left and right track drives 34 and 32 to effectuate accurate turns by continuously adjusting the prior art left and right track levers 64 and 66, respectively. This task is substantially complicated since the prior art track levers 64 and 66 also control the propulsion of the track drives 34 and 32, respectively.

In stark contrast, the multiple mode steering control 92 provides a single control for steering both the left and right track drives 34 and 32. Moreover, the steering control 92 provides the operator of a track trencher 30 with a more natural or intuitive means for steering the track trencher 30, as discussed in greater detail with reference to FIG. 16.

Figure 13:
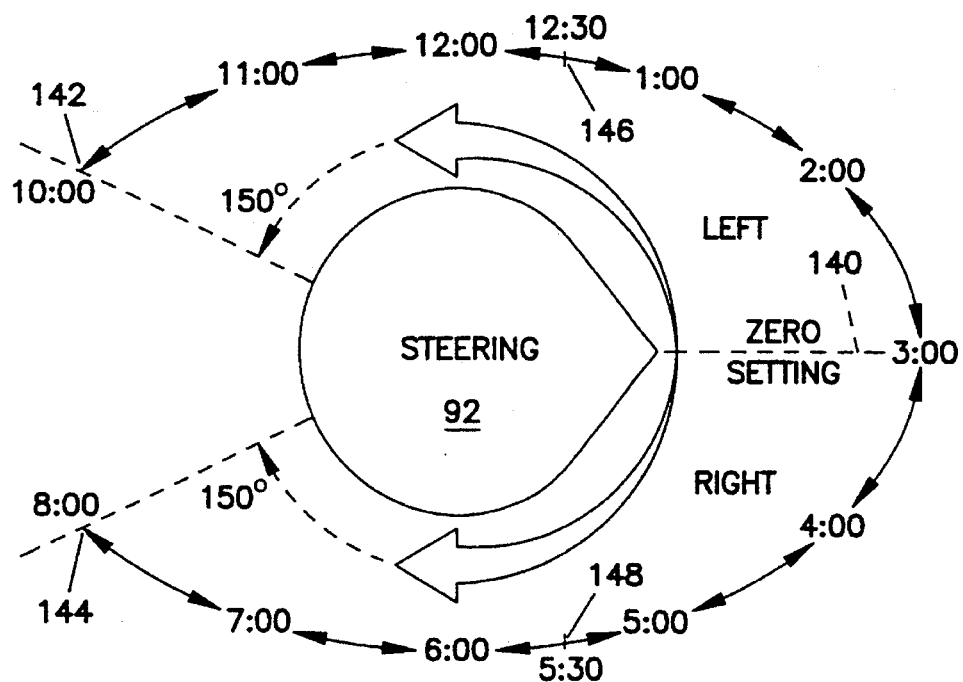
FIG. 13 is a graphical illustration of a novel multiple mode steering control and its operation in both a transport mode and a trench mode.
Figure 20:
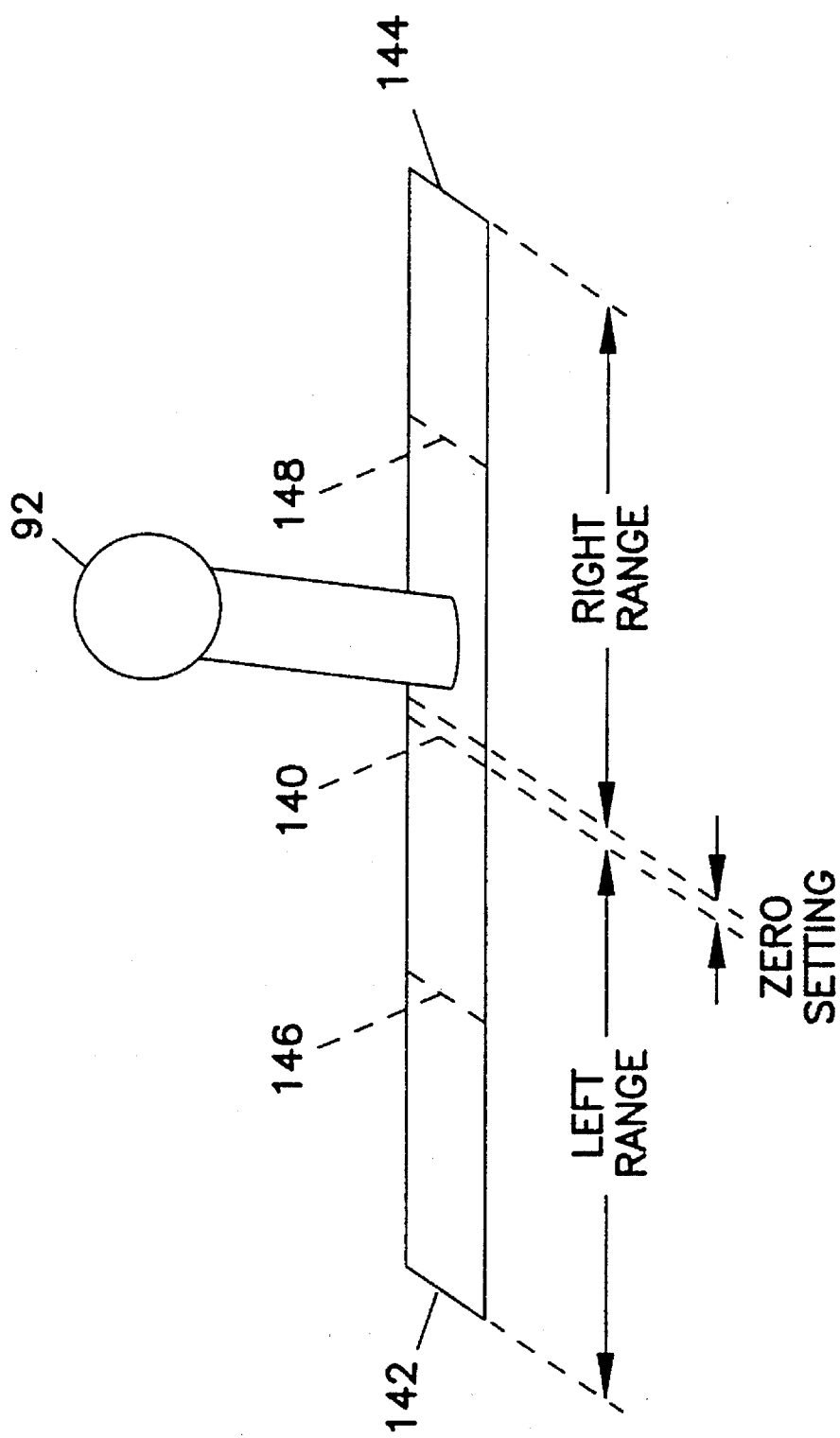
FIG. 20 illustrates an alternative configuration of a novel multiple mode steering control.

The multiple mode steering control 92, shown in FIGS. 13 and 20, is operable in a plurality of steering modes, with the characteristics of a particular steering mode being preferably alterable by selection of one of a plurality of travel modes.

In one embodiment, the steering control 92 is a rotary control comprising a potentiometer, and having a neutral or zero setting 140 and a range of left and right settings. In another embodiment, the steering control 92 comprises a steering wheel having substantially the same settings. The steering control 92 can preferably be rotated through 150 degrees of left settings and 150 degrees of right settings with respect to the zero setting 140. The magnitude of left and right turning is preferably proportional to the degree to which the steering control 92 is rotated from the zero setting 140 in the left and right directions, respectively.

Steering a track trencher 30 by employing the multiple mode steering control 92 illustrated in FIG. 13 differs fundamentally from the manner in which steering is accomplished by prior art left and right track levers 64 and 66. Conventional left and right track levers 64 and 62 independently steering an propel left and right track drives 34 and 32, with turning being accomplished typically by increasing the velocity of one track drive relative to the other track drive. The steering control 92, in contrast, controls the steering of a track trencher 30 preferably by decreasing the velocity of only one track drive relative to the other track drive.

An important advantage of steering a track trencher 30 using the steering control 92 concerns the manner in which steering is accomplished when operating a track trencher 30 in a trench mode and a transport mode. When the travel mode control 94 is set to the trench mode, the steering control 92 preferably operates in a trench steering mode as characterized in FIG. 14. The steering control 92 preferably operates in a transport steering mode, as characterized in FIG. 15, when the transport mode is selected.

Figure 14:
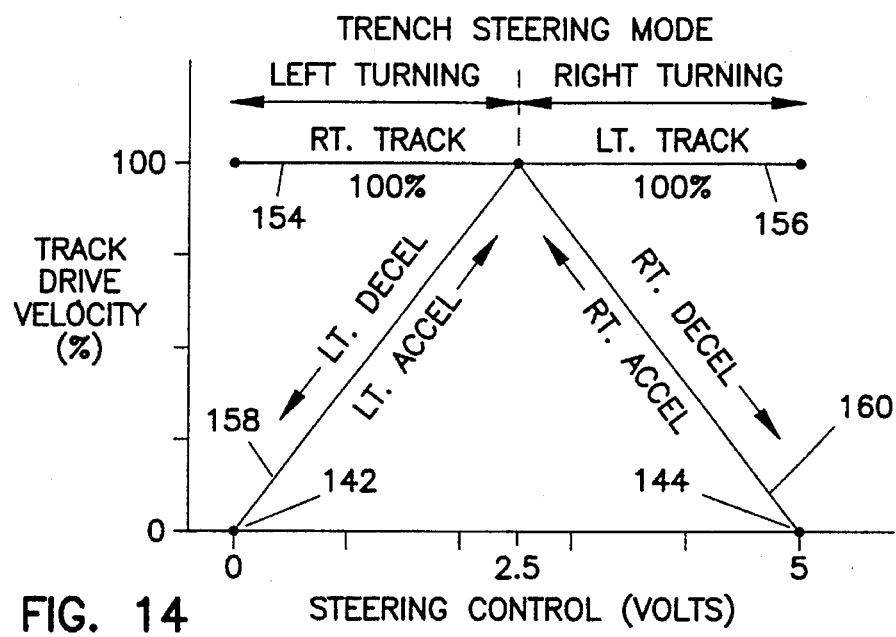
FIG. 14 is a graph illustrating the left and right track drive steering characteristics of a track trencher operating in a trench mode when a novel multiple mode steering control is employed.

The relationship between the magnitude of the left and right track drive 34 and 32 velocities in response to steering signals produced by the steering control 92 when operating a track trencher 30 in a trench mode is illustrated in FIG. 14. The X-axis represents a preferred range of output voltage signals produced by the steering control 92. The Y-axis represents a range of forward track drive velocities measured as percentages of a selected track drive velocity relative to full velocity. Full track drive velocity is preferably determined by the particular setting of the propel control 90. The steering control 92 preferably produces an output voltage signal of 2.5 volts when set to the zero setting 140, and results in steering the track trencher 30 in a straight direction. Output voltage signals between zero and 2.5 volts are preferably associated with left turns, and output voltage signals between 2.5 volts 5.0 volts are preferably associated with right turns.

Steering the track trencher 30 in a right direction while in the trench mode is accomplished by turning the steering control 92 from the zero setting 140 in a right direction toward the maximum right setting 144. As the steering control 92 is turned in the right direction, the left track drive 34 is maintained at 100% of full propulsion, as indicated by line 156, while the right track drive 32 decelerates to a lower velocity, as indicated by line 160. Similarly, steering a track trencher 30 in a left direction is accomplished by turning the steering control 92 in the left direction. A maximum left turn, for example, is characterized by the right track drive 32 being maintained at 100% of full velocity, as indicated by line 154, while the left track drive 34 is held at zero velocity, as indicated at 142 of line 158.

In a preferred embodiment, the steering control 92 provides additional functionality when operating the track trencher 30 in a transport mode of travel. Selection of a transport steering mode enables the left and right track drives 34 and 32 to operate in a counter-rotation mode for accomplishing small radius turns. The term "counter-rotation" is generally understood in the art as referring to a method of turning a tractor-type machine whereby one track drive is operated at a forward velocity while the other track drive is operated at a reverse velocity.

When a transport steering mode is selected, a high level of maneuverability is often desirable. In a preferred embodiment, the steering control 92 provides steering in a manner similar to that previously described with reference to FIG. 14 until a left or right transition setting 146 or 148 is exceeded. Setting the steering control 92 between the transition settings 146 and 148 and maximum settings 142 and 144, respectively provides a proportional degree of counter-rotation steering in a left and right direction for maneuvering a track trencher 30. For illustrative purposes, the steering control 92 is shown initially set to a zero setting 140 at a 3 o'clock (3:00) position. Turning the track trencher 30 in the left direction is accomplished by rotating the steering control 92 between the 3:00 position and a maximum left setting 142 at the 10:00 position. When the left transition setting 146 at the 12:30 position is exceeded, counter-rotation steering is employed for steering control 92 settings between the 12:30 position and the 10:00 position. Turning the track trencher 30 in the right direction is accomplished in substantially the same manner.

Figure 15:
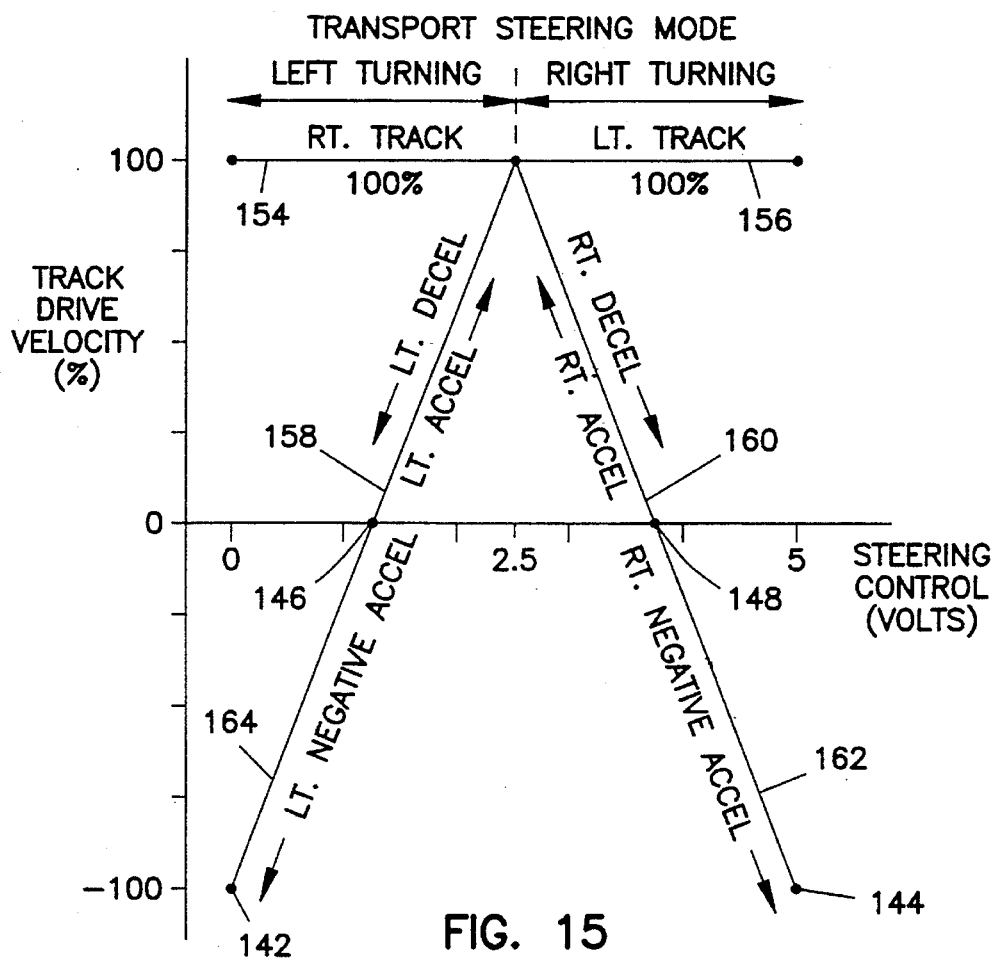
FIG. 15 is a graph illustrating the left and right track drive steering characteristics of a track trencher operating in a transport mode when a multiple mode steering control is employed.

Turning now to FIG. 15, the preferred steering characteristics of the steering control 92 when operating a track trencher 30 in a transport steering mode are illustrated. A right turn, for example, is accomplished by turning the steering control 92 from the zero setting 140 at the 3:00 position toward the maximum right setting 144 at the 8:00 position. For steering control 92 settings between the zero setting 140 and the right transition setting 148 at the 5:30 position, a right turn is accomplished by maintaining the left drive track 34 at 100% of full velocity, shown as line 156, while the velocity of the right track drive 32 is reduced, shown as line 160.

The right transition setting 148 at the 5:30 position is characterized by the left track drive 34 operating at 100% of full velocity while the right track drive 32 is held at zero velocity. Turning the steering control 92 beyond the right transition setting 148 results in the application of a negative velocity to the right track drive 32. Maximum right turning is accomplished by setting the steering control 92 to the maximum right setting 144 at the 8:00 position, wherein the left drive track 34 is maintained at 100% of full velocity in the forward direction, and the right drive track 32 is maintained at 100% of full velocity in the reverse direction, thereby employing 100% of counter-rotation steering.

As discussed previously, the steering control 92 typically produces output voltage signals between zero and 2.5 volts to accomplish left turns, and output voltage signals between 2.5 and 5.0 volts to accomplish right turns. The steering control 92 preferably produces output voltage signals of 1.25 and 3.75 volts when set to the left and right transition settings 146 and 148, respectively.

It is to be understood that the characteristic steering curves illustrated in FIGS. 14 and 15 are provided for illustrative purposes only, and do not constitute a limitation on the manner in which the novel steering control 92 accomplishes steering of a track trencher. For example, FIGS. 14 and 15 illustrate a direct proportionality between the steering control 92 output voltage signals and the left and right track drive 34 and 32 velocities. The left and right track drive velocity lines 158 and 160 may, for example, describe a polynomial functional relationship between the steering control 92 output voltage signals and the left and right track drive 34 and 32 velocities. Further, the left and right track drive velocity lines 154 and 156, being depictive of 100% of full track drive velocity, may be adjusted to a velocity less than 100% of full velocity, and need not be held at a constant percentage of full track drive velocity. Moreover, the left and right transition settings 146 and 148 may be located at steering control 92 settings other than the 12:30 and 5:30 positions illustrated in FIG. 13.

In another embodiment, the steering control 92, as shown in FIG. 20, may comprise a steering lever, rather than a rotary steering control. A zero setting 140 is associated with steering a track trench 30 in a straight direction, with the left and right track drives 34 and 32 preferably operating at the same velocity. A right range of steering control 92 settings is shown defined between a neutral setting 140 and a maximum right setting 144. The multiple mode steering control 92, shown in FIG. 20, preferably functions in at least two modes, a trench steering mode and a transport steering mode.

Turning a track trencher in a right direction while operating in a trench steering mode is accomplished by moving the steering control 92 between a zero setting 140 and a maximum right setting 144, while left turns are accomplished by moving the steering control 92 between the zero setting 140 and a maximum left setting 142. Adjustment of the left and right track drive 34 and 32 velocities in response to the setting of the steering control 92 shown in FIG. 20 is preferably similar to that previously described with respect to FIG. 14.

Steering of the track trencher 30 using the steering control 92 shown in FIG. 20 while operating the track trencher 30 in a transport steering mode is accomplished in a similar manner by moving the steering control 92 to a desired left or right turning setting with respect to the zero setting 140. Moving the steering control 92 beyond the left and right transition settings 146 and 148 respectively invokes left and right counter-rotation steering preferably in a manner similar to that previously described with respect to FIG. 15.

Figure 16:
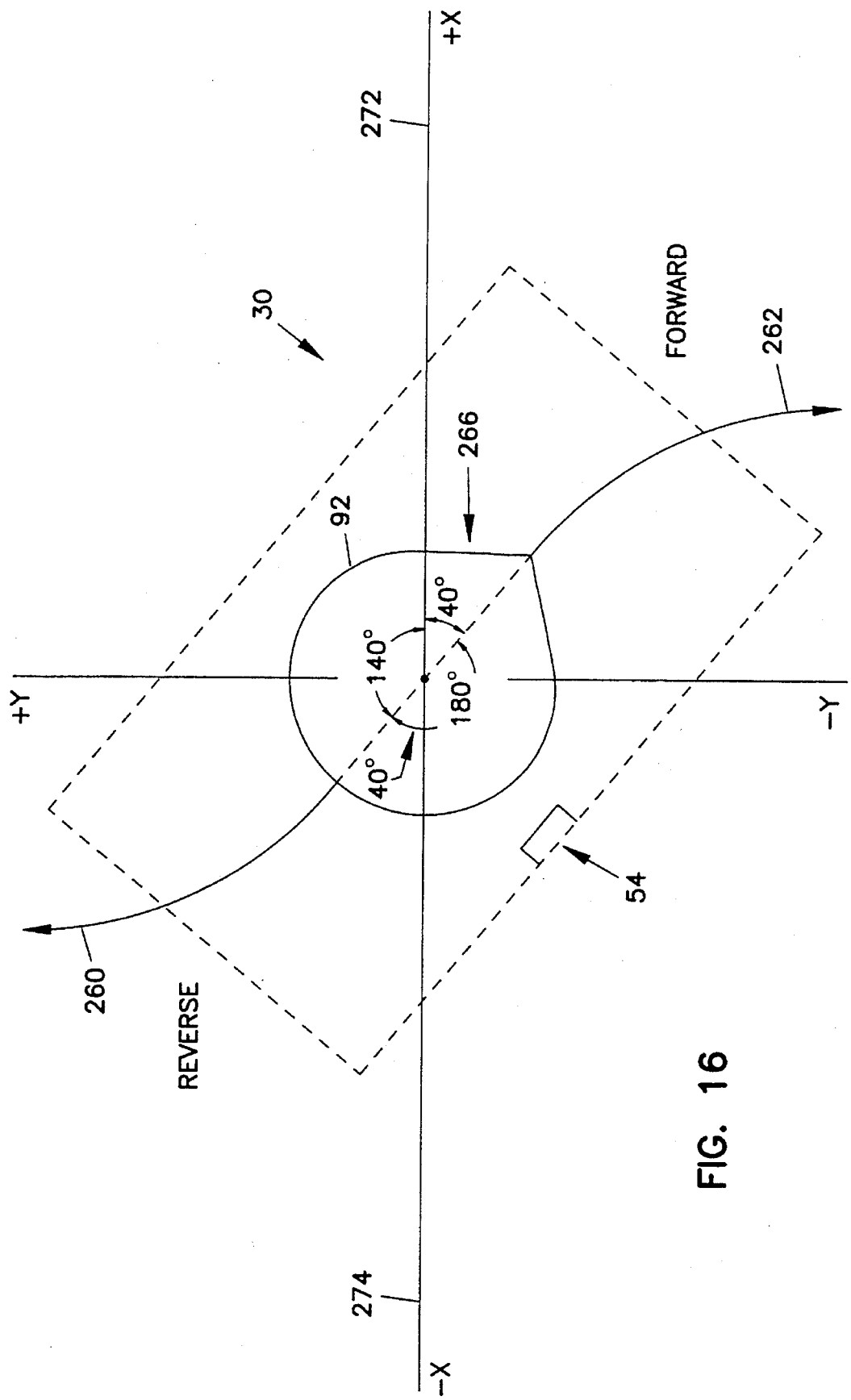
FIG. 16 is a graphical illustration of the intuitive steering capability provided by a novel multiple mode steering control.

Turning now to FIG. 16, there is shown an exaggerated illustration of the novel manner in which the multiple mode steering control 92 steers a track trencher 30 when transitioning between a forward and a reverse direction. As illustrated, the track trencher 30 includes an operator's seat 54 from which an operator has set the steering control 92 to a right direction setting 266 in order to perform a 40 degree right turn with respect to the positive X-axis 272. Moving in a forward direction, the track trencher will preferably follow a forward curved path 262.

Assuming that the operator sets the propel control 90 to a reverse setting while traveling on a forward curved path 262, the track trencher 30 will operate in a reverse direction and preferably follow a reverse curved path 260. It is noted that the reverse curved path 260 would normally be associated with a left steering control setting of 140 degrees from the positive X-axis 272 (or +40 degrees from the negative X-axis 274), which is 180 degrees from the originally selected 40 degree forward right steering control setting 266 associated with the forward curved path 262. The steering control 92, however, preferably remains at the same 40 degree forward setting 266 with respect to the positive X-axis 272 to navigate the reverse curved path 260. It has been determined by the inventor that the unique 180 degree "flip-flop" operation of the steering control 92, e.g. the automatic 180 degree directional change in steering control 92 operation, upon transitioning between a forward and a reverse direction provides an operator with an intuitive or natural means for steering a track trencher 30.

Figure 17:
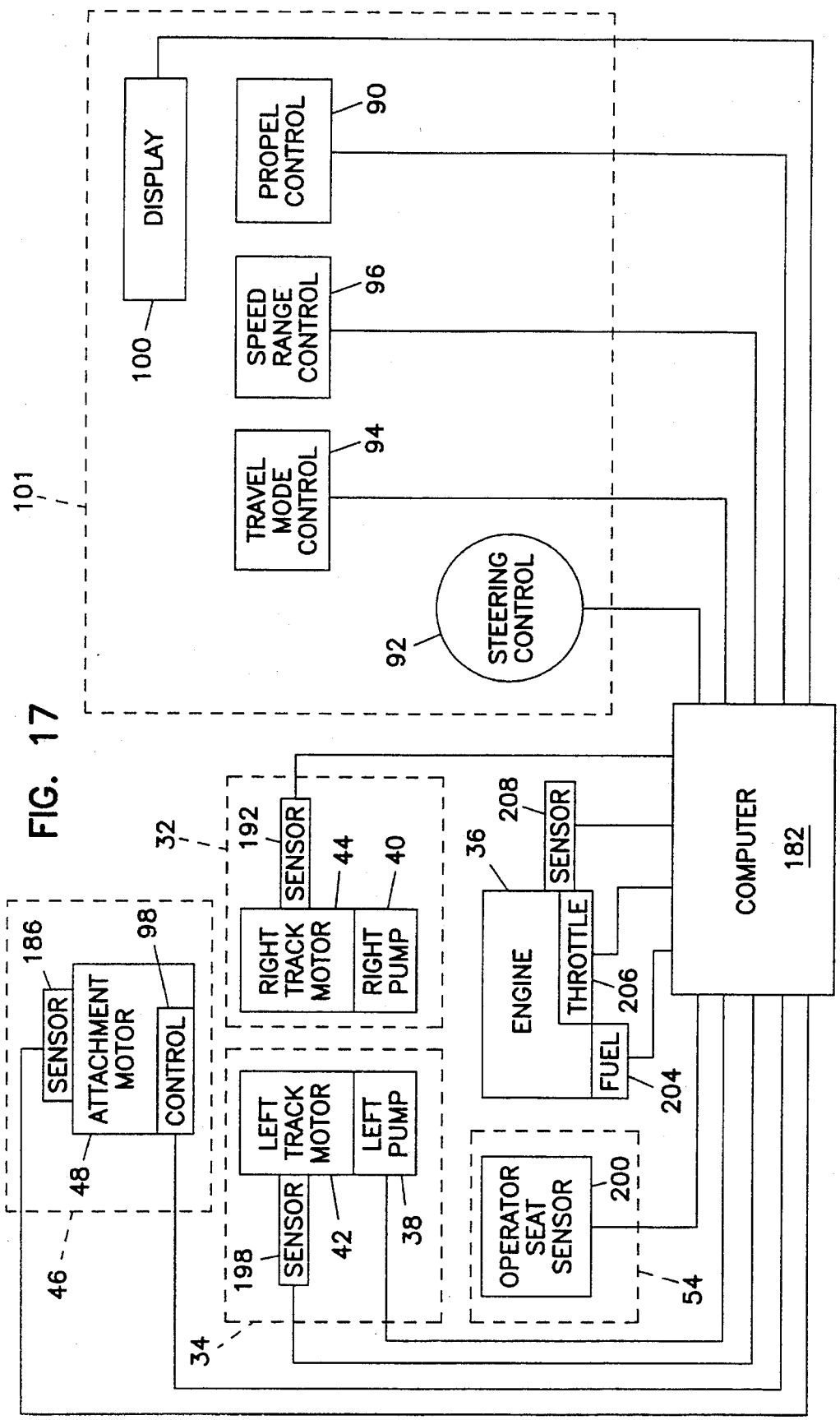
FIG. 17 is a block diagram illustrating a computer system for controlling the propulsion and steering of a track trencher employing multiple mode propel and steering controls.

The novel propel and steering controls 90 and 92 provide advantageous propulsion and steering functions when controlling a track trencher 30 in combination with a computer 182 as illustrated in FIG. 17. Although both the propel control 90 and steering control 92 are shown as comprising the control system in FIG. 17 and are generally discussed herein in combination with regard to operating a track trencher 30, it is to be understood that each of the controls 90 and 92 independently provides advantageous functionality exclusive of the other. The advantages previously discussed when controlling propulsion of a track trencher 30 using the multiple mode propel control 90, for example, are realized irrespective of the inclusion or exclusion of the steering control 92 from the system illustrated in FIG. 17. Similarly, the advantages provided by the novel steering control 92 are realizable without incorporating the propel control 90 into such a control system.

In a preferred configuration, the left track drive 34 typically comprises a left track pump 38 coupled to a left track motor 42, and the right track drive 32 typically comprises a right track pump 40 coupled to a right track motor 44. Left and right track motor sensors 198 and 192 are preferably coupled to the left and right track motors 42 and 44, respectively. The left and right track pumps 38 and 40, deriving power from the engine 36, preferably regulate oil flow to the left and right track motors 42 and 44 which, in turn, provide propulsion for the left and right track drives 34 and 32.

The attachment 46 preferably comprises an attachment motor 48 and an attachment control 98, with the attachment 46 preferably deriving power from the engine 36. A sensor 186 is preferably coupled to the attachment motor 46. Actuation of the left track motor 42, right track motor 44, and attachment motor 48 is monitored by sensors 198, 192, and 186 respectively. The output signals produced by the sensors 198, 192, and 186 are communicated to the computer 182.

The computer 182, upon receiving a travel mode signal from the travel mode control 94, preferably modifies the functionality of the multiple mode steering control 92 and propel control 90 for operation in either a transport mode or a trench mode. The travel mode control 94 preferably produces a transport mode signal which is communicated to the computer 182 when the transport mode is selected, and produces and communicates to the computer 182 a trench mode signal when the trench mode is selected. The functionality of the steering control 92 and propel control 90, in response to the state of the travel mode control 94, is modified by the computer 182 to perform in a manner previously discussed hereinabove.

In response to the steering and propel control signals, the computer 182 communicates control signals, typically in the form of control current, to the left and right track pumps 38 and 40 which, in turn, regulate the speed at which the left and right track motors 42 and 44 operate. The left and right track motor sensors 198 and 192 communicate track motor sense signals to the computer 182 indicative of the actual speed of the left and right track motors 42 and 44. Similarly, an engine sensor 208, coupled to the engine 36, provides an engine sense signal to the computer 182, thus completing a closed-loop control system for the tractor portion 45 of a track trencher 30. Those skilled in the art will recognize that various known computer configurations will provide a suitable platform for effectuating propulsion and steering changes of a track trencher 30 in response to the propel and steering signals produced by the multiple mode propel and steering controls 90 and 92.

The attachment 46 portion of a track trencher 30 includes an attachment motor 48, attachment control 98 and at least one attachment sensor 186. The attachment motor 48 preferably responds to instructions communicated to the attachment control 98 from the computer 182. The actual output of the attachment motor 48 is monitored by the attachment sensor 186, which produces an attachment sense signal received by the computer 182.

In a preferred embodiment, the left and right track motor sensors 198 and 192 are of a type generally referred to in the art as magnetic pulse pickups, or PPUs. The PPUs 198 and 192 transduce track motor rotation into a continuous series of pulse signals, wherein the pulse train preferably represents the frequency of track motor rotation as measured in revolutions-per-minute.

Another important advantage of a track trencher control system incorporating the novel propel control 90 concerns the manner in which a computer 182 maintains the left and right track drives 34 and 32 at a target track drive propulsion level when operating a track trencher 30 in a transport mode. When a transport mode of travel is selected, the propel control 90 preferably produces a transport propel control signal which is representative of a target velocity for the left and right track motors 42 and 44, typically measured in revolutions-per-minute. Conversion of the transport propel signal into a target track motor velocity may be accomplished by the propel control 90 itself or, preferably, by the computer 182.

The computer 182 typically compares the left and right track motor sense signals respectively produced by the left and right PPU sensors 198 and 192 to the target track motor propulsion level represented by the transport propel signal. The computer 182 communicates the appropriate pump control signals to the left and right track pumps 38 and 40 in response to the outcome of the comparison to compensate for any deviation between the actual and target track motor propulsion levels.

Figure 21:
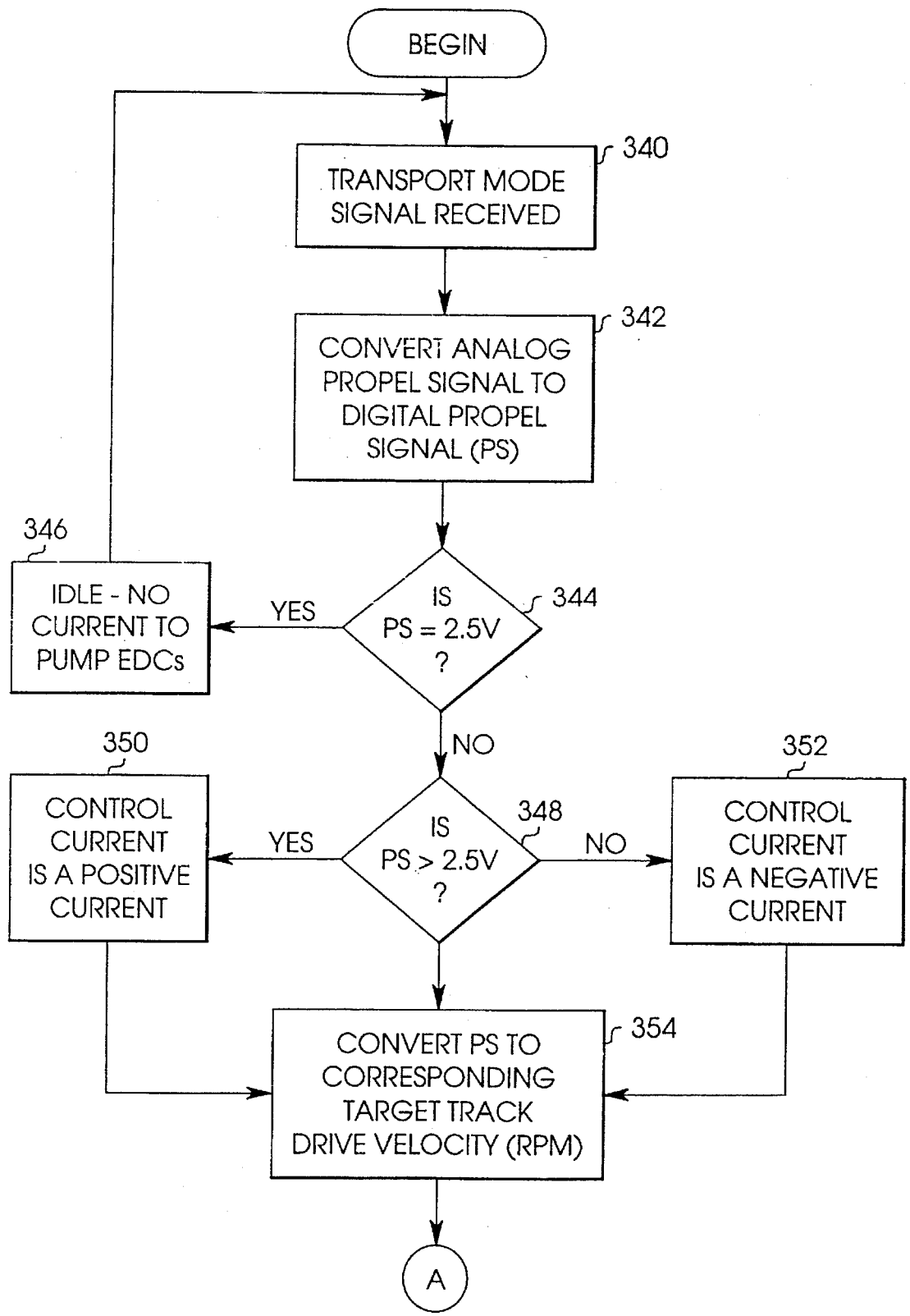
FIG. 21 illustrates a first part of a control process for modifying track drive propulsion levels in response to transport propel signals produced by a novel multiple mode propel control.
Figure 22:
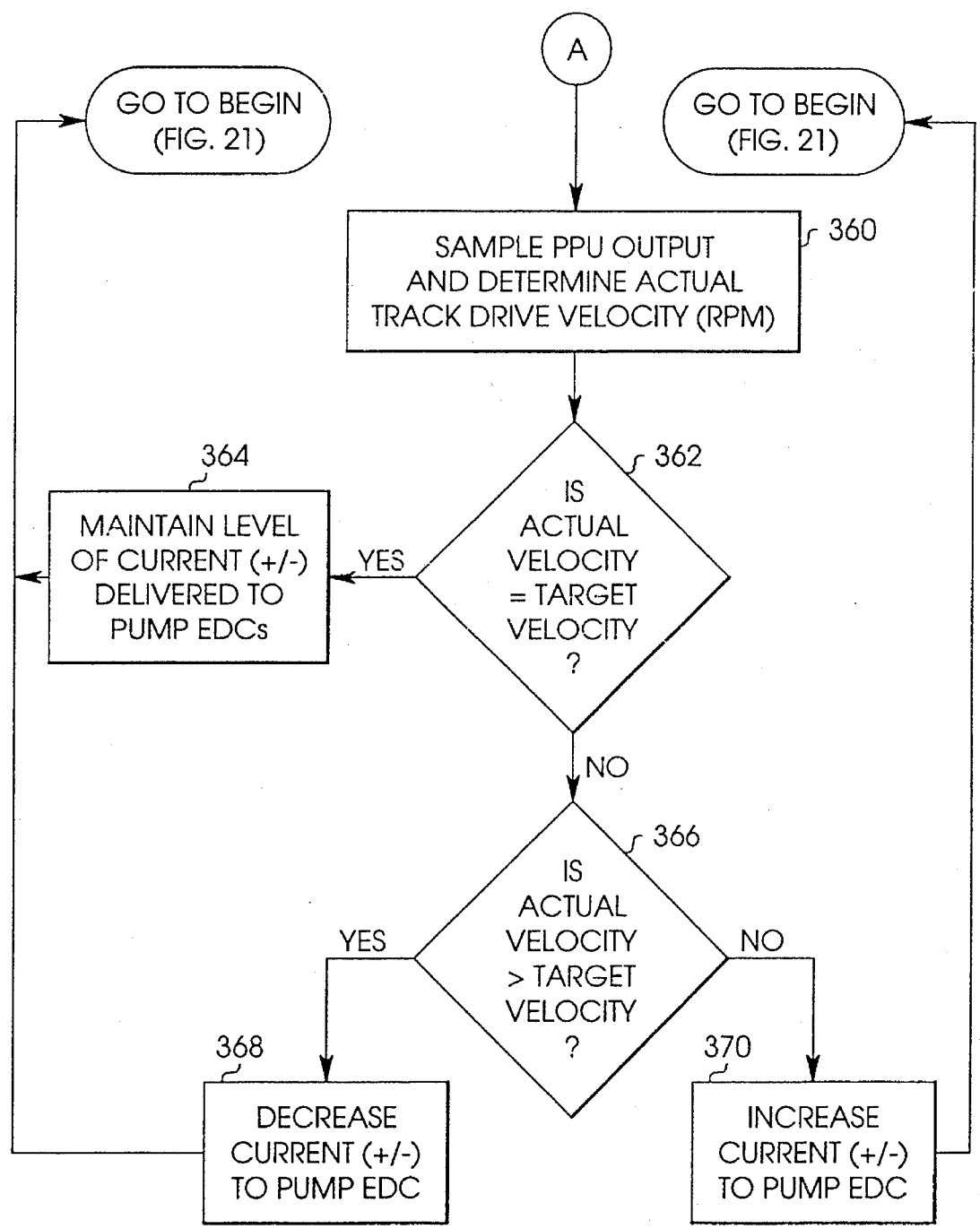
FIG. 22 illustrates a second part of a control process for modifying track drive propulsion levels in response to transport propel signals produced by a novel multiple mode propel control.

A more detailed description of the manner in which a computer system typically controls the propulsion of a track trencher 30 in response to the control signals produced by the novel multiple mode propulsion control 90 is provided hereinbelow with reference to FIGS. 21–24. FIGS. 21 and 22 illustrate one embodiment of a control process by which the computer 182 controls the propulsion of a track trencher 30 while operating in a transport mode of travel. When a transport mode of travel is selected, as at step 340, the computer 182 converts an analog propel control signal produced by the propel control 90 to a corresponding digital transport propel signal at step 342.

Operating a track trencher 30 in an idle state, whereby no power is delivered to the left and right track motors 42 and 44, is preferably associated with a transport propel signal equivalent to 2.5 volts as previously discussed with regard to FIGS. 9 and 10. The magnitude of the transport propel signal is tested at step 344, and if found to be equivalent to 2.5 volts, no current is delivered to the electrical displacement controls (EDC) which respectively control the output level of the left and right pumps 38 and 40. If the transport propel signal is greater than 2.5 volts, as tested at step 348, the control current delivered to the left and right pump EDCs is preferably a positive current. A transport propel signal less than 2.5 volts is preferably associated with a negative control current at step 352. The transport propel signal is then converted by the computer 182 into a corresponding target track motor velocity at step 354. The computer 186 typically associates the value of the digital transport propel signal to a corresponding target track motor velocity within a range of target track motor velocities previously stored in the computer 186. It is noted that the computer 182 typically calculates the necessary amount of control current delivered to the left and right track pumps 38 and 40 to maintain the left and right track motors 42 and 44 at the target track motor velocity associated with the transport propel signal.

As shown in FIG. 22, the output of the PPU sensors 198 and 192 of the left and right track motors 42 and 44, respectively, are sampled at step 360, and actual track motor velocities are determined. Actual track motor velocity is compared to the target track motor velocity at step 362, and if equivalent, the positive or negative control current delivered to the pump EDCs is maintained at step 364. If the actual track motor velocity is greater than the target motor velocity, as at step 366, the computer 182 decreases the positive or negative current supplied to the pump EDCs at step 368. The control current supplied to the pump EDCs is increased at step 370 if the actual track motor velocity is less than the target track motor velocity determined at step 366.

The multiple mode propel control 90, in combination with the computer 182, provides additional functionality when operating a track trencher 30 in a trench travel mode. When operating in a trench mode, the computer 182 preferably moderates propulsion of the left and right track motors 42 and 44 in response to the state of the engine 36. When the computer 182 receives a trench mode signal from the travel mode control 94, the propel control 90 produces a trench propel signal that is preferably representative of a target output level of the engine 36. For example, it may be desirable to operate a particular engine at 2,200 RPMs during excavation. Accordingly, the propel control 90 at the maximum forward setting 112 will produce a trench propel signal representative of a target engine output level of 2,200 RPMs. The output level of the left and right track motors 42 and 44 will be adjusted by the computer 182 so that the desired 2,200 RPM target engine output level is maintained, preferably within a margin of tolerance.

In one embodiment, the computer 182 modifies the trench propel signal to maintain the engine 36 at the target engine output level. As such, the operator need not make any adjustments to the propel control 90 during excavation. Instead, the computer 182 modifies or scales the trench propel signal to an appropriate level to effectively increase or decrease the propulsion level of the left and right track motors 42 and 44 depending of the loading on the engine 36. The computer 182 thus controls the loading of the engine 36 by modifying the propulsion levels of the left and right track drives 34 and 32 during excavation. Various analog and digital devices are known in the art for effectuating load control of an engine to maintain the engine at a constant speed under varying load conditions. One such analog load controller is the Model MCE101C Load Controller manufactured by Sauer Sundstrand. A suitable digital device that can be adapted to perform engine load control is the Model DC2 Microcontroller, also manufactured by Sauer Sundstrand.

The left and right motor sensors 198 and 192 preferably communicate actual track motor speed, measured in revolutions-per-minute, to the computer 182. The engine 36 preferably includes an engine sensor 208 which monitors the speed of the engine 36, also measured in revolutions-per-minute, and communicates actual engine speed to the computer 182. Any deviation between the actual and target engine output levels is compensated for by the computer 182 communicating the appropriate pump control signals to the left and right track pumps 38 and 40, which, in turn, regulate the speed at which the left and right track motors 42 and 44 operate.

Figure 23:
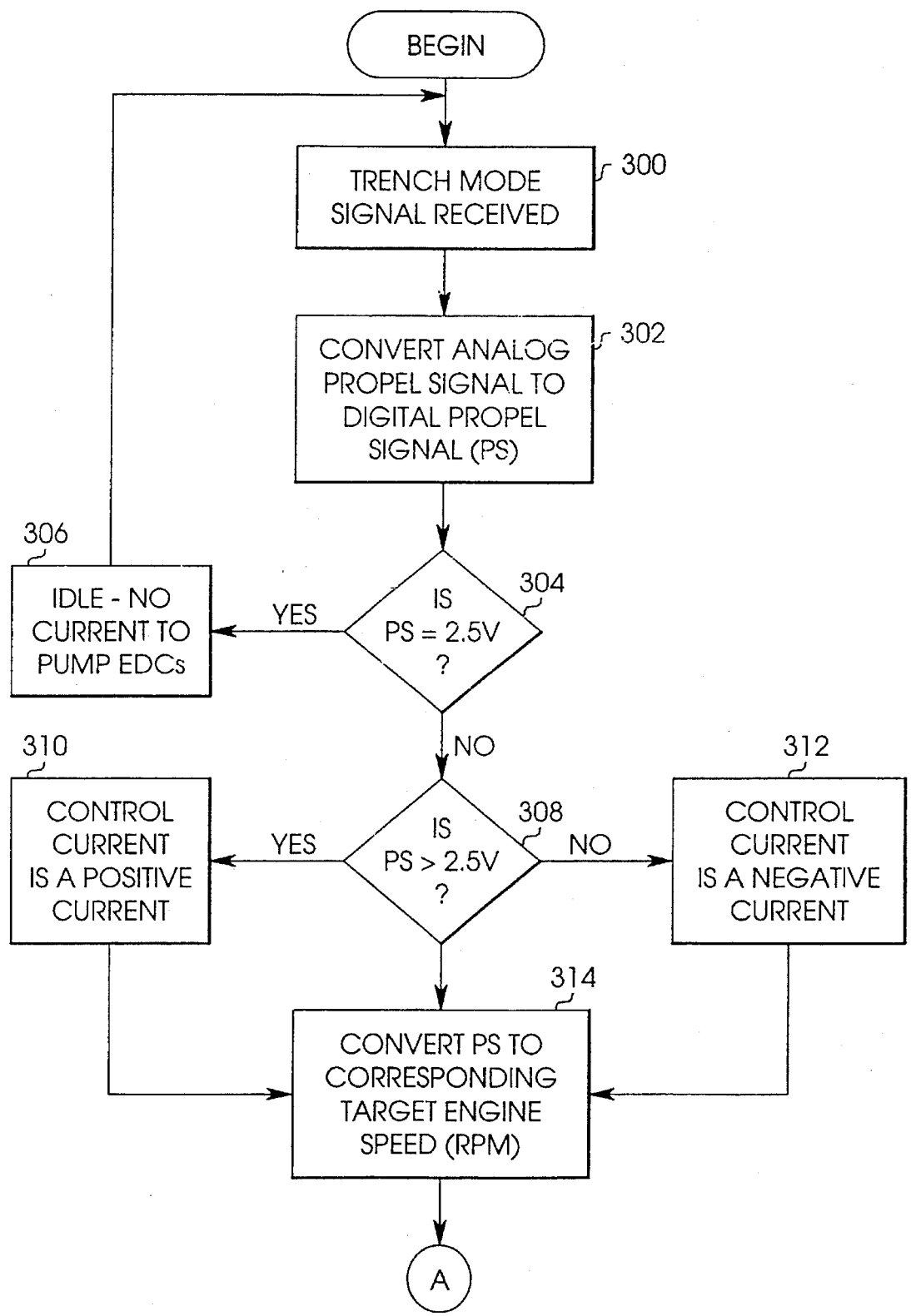
FIG. 23 illustrates a first part of a control process for modifying track drive propulsion levels in response to trench propel signals produced by a novel multiple mode propel control.
Figure 24:
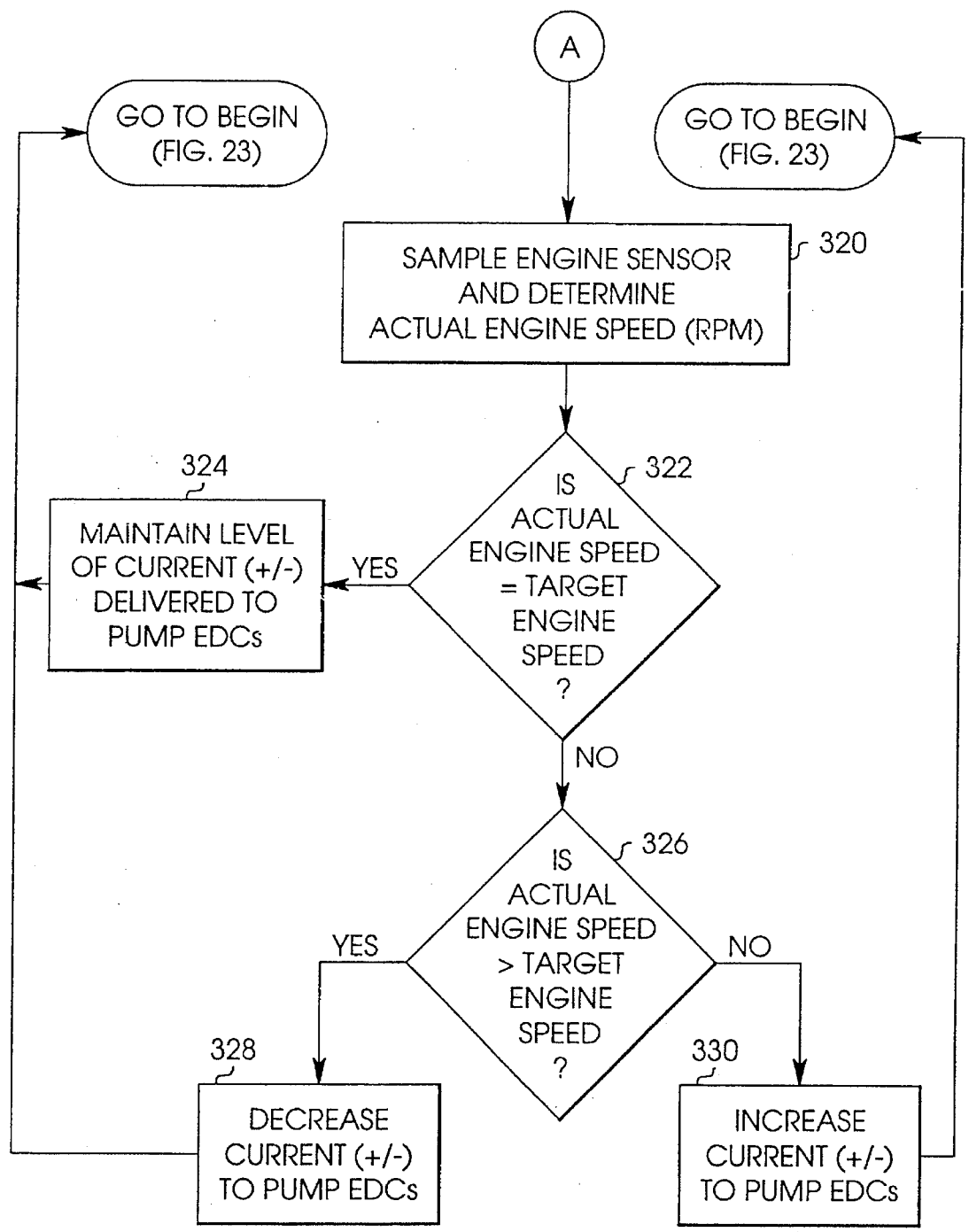
FIG. 24 illustrates a second part of a control process for modifying track drive propulsion levels in response to trench propel signals produced by a novel multiple mode propel control.

Referencing now FIGS. 23 and 24, when a trench mode signal is received at step 300, an analog trench propel signal produced by the propel control 90 is converted to a digital trench propel signal at step 302. If the trench propel signal is equivalent to 2.5 volts, as at step 304, no current is delivered to the EDCs of the left and right pumps 38 and 40, respectively, at step 306. If the trench propel signal is greater than 2.5 volts, as at step 308, the control current delivered to the pump EDCs is a positive current, as at step 310. The control current is a negative current, at step 312, if the trench propel signal is less than 2.5 volts. At step 314, the trench propel signal is converted to a corresponding target engine speed, preferably by associating the trench propel signal to a corresponding engine speed previously stored in the computer 182.

The actual speed of the engine 36 is determined by sampling the engine sensor 208 at step 320. If the actual engine speed is equivalent to the target engine speed at step 322, the same level of positive or negative current is delivered to the pump EDCs at step 324. If the actual engine speed is greater than the target engine speed at step 326, the positive or negative control current delivered to the pump EDCs is decreased at step 328. The positive or negative control current delivered to the pump EDCs is increased at step 330 if the actual engine speed is less than the target engine speed.

Figure 29:
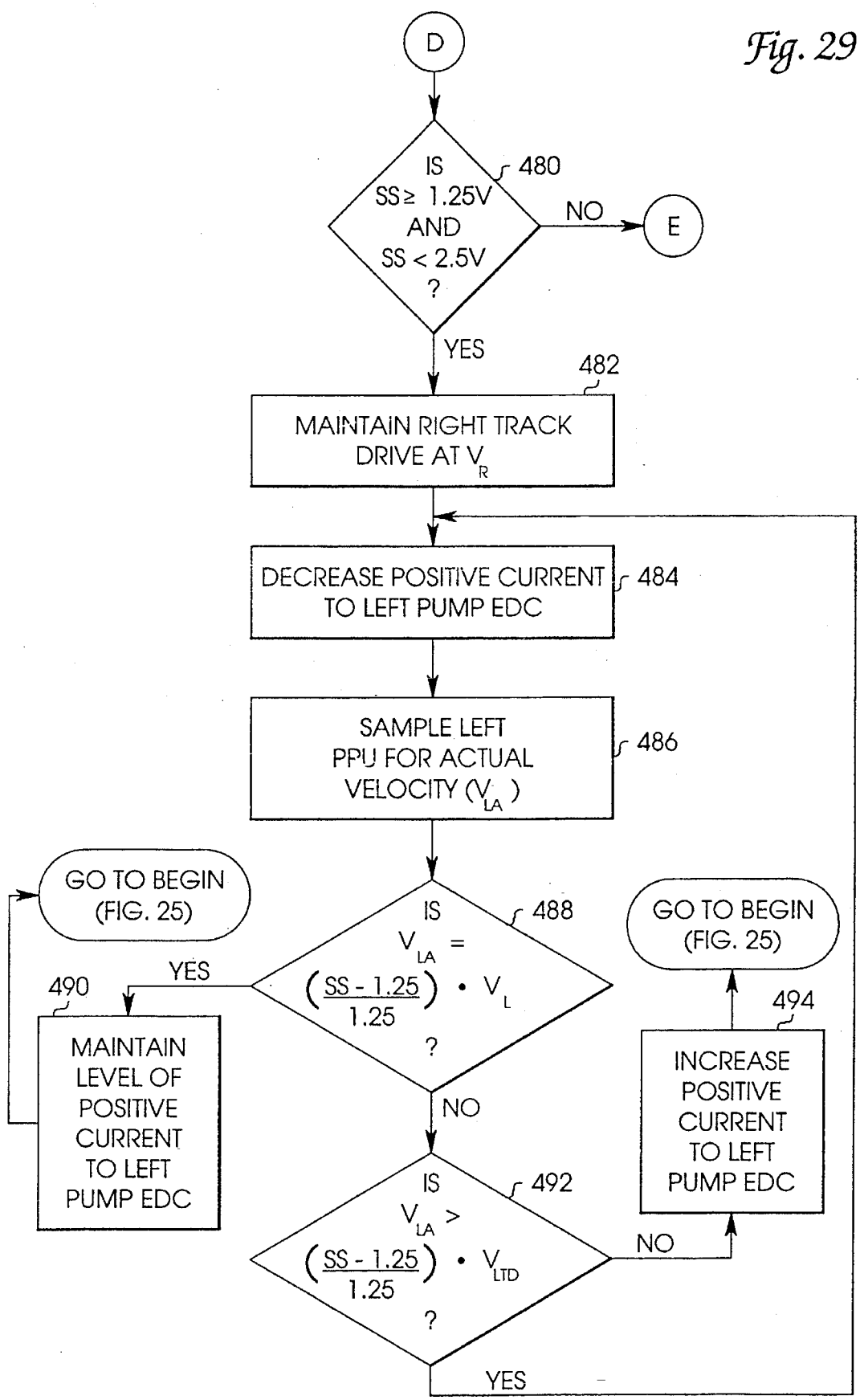
FIG. 29 illustrates a fifth part of a control process for effectuating steering of a track trencher operating in a transport node in response to steering control signals produced by a novel multiple mode steering control.
Figure 30:
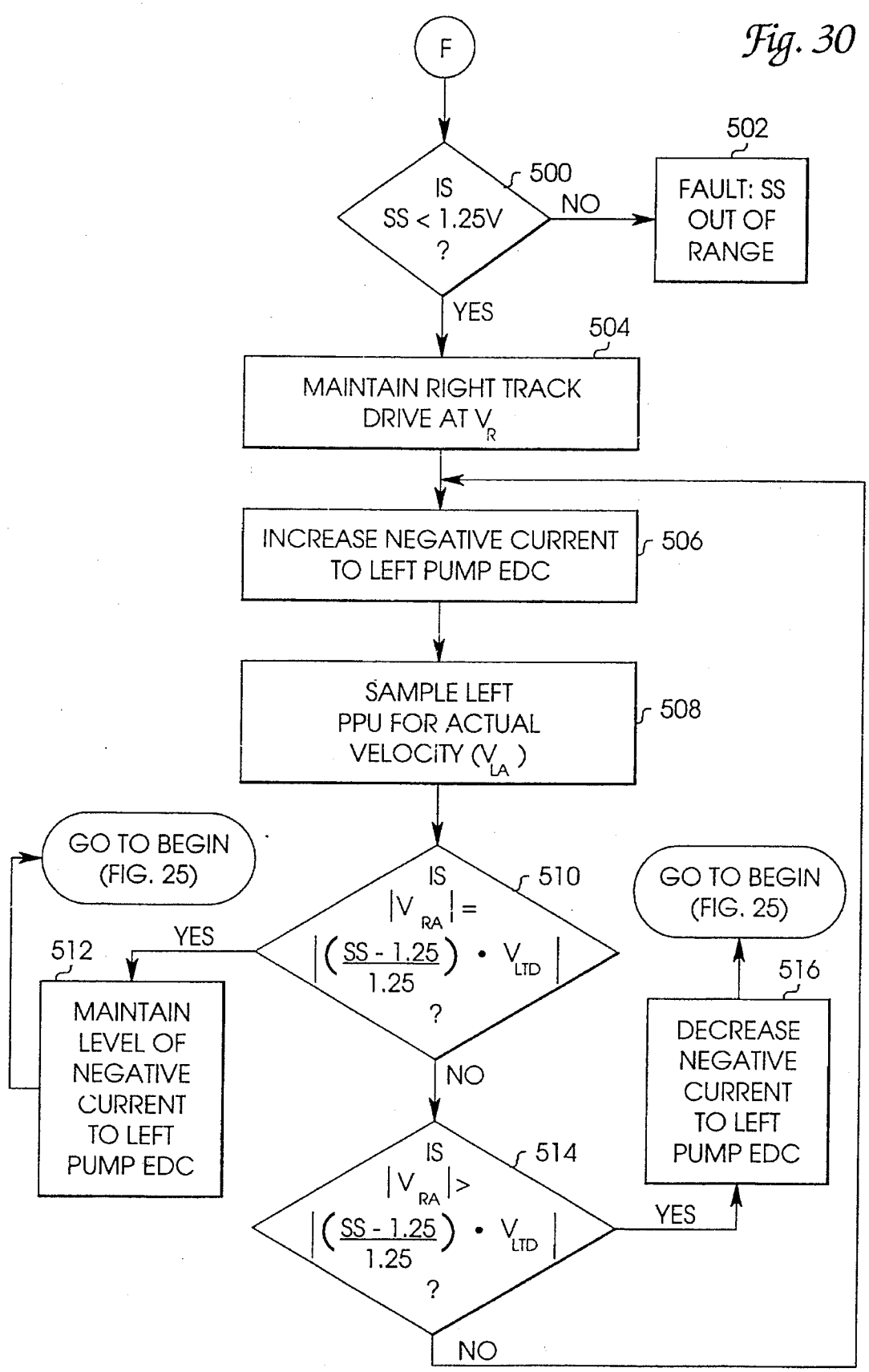
FIG. 30 illustrates a sixth part of a control process for effectuating steering of a track trencher operating in a transport mode in response to steering control signals produced by a novel multiple mode steering control.
Figure 31:
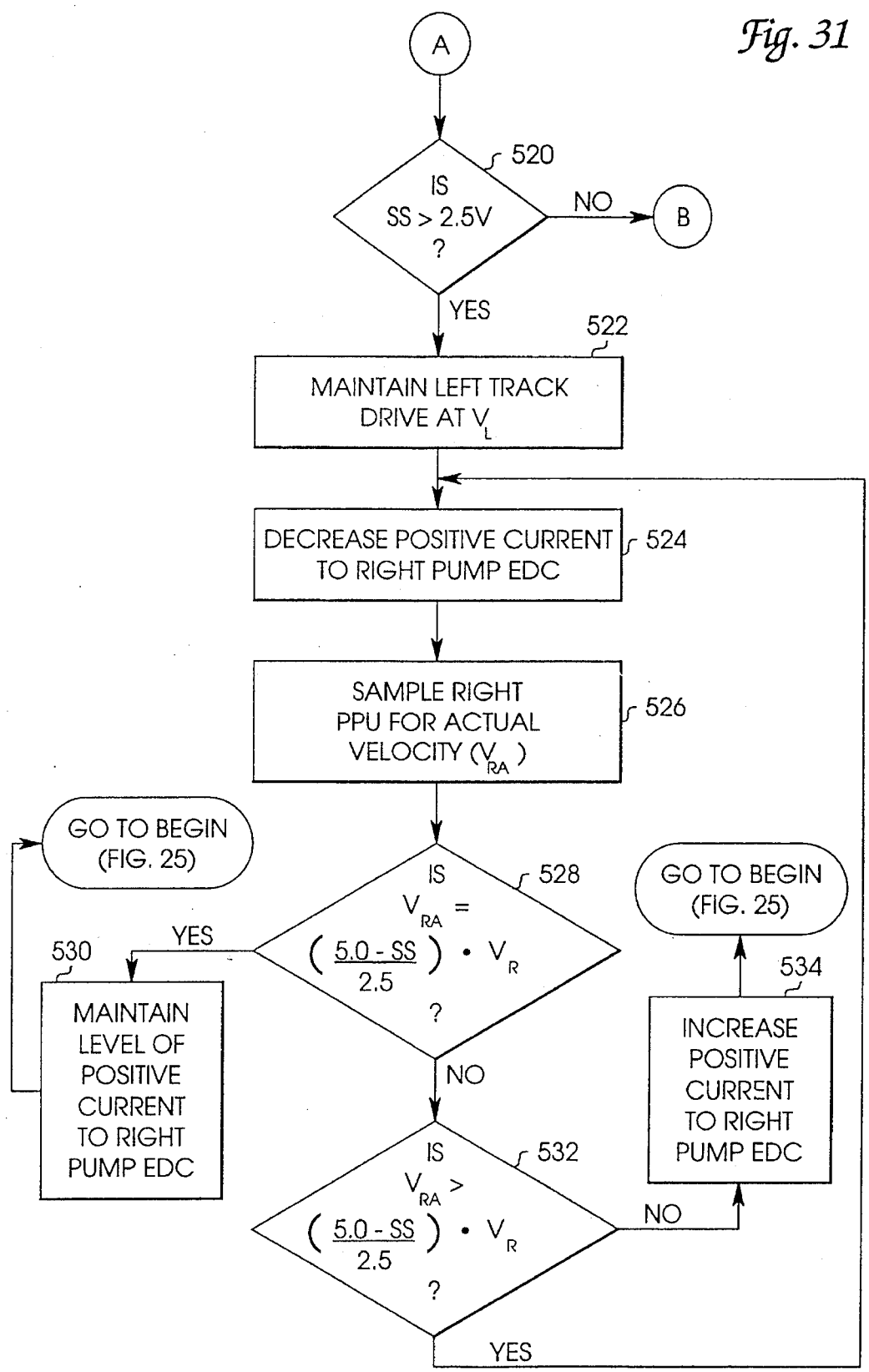
FIG. 31 illustrates a first part of a control process for effectuating steering of a track trencher operating in a trench mode in response to steering control signals produced by a novel multiple mode steering control.
Figure 32:
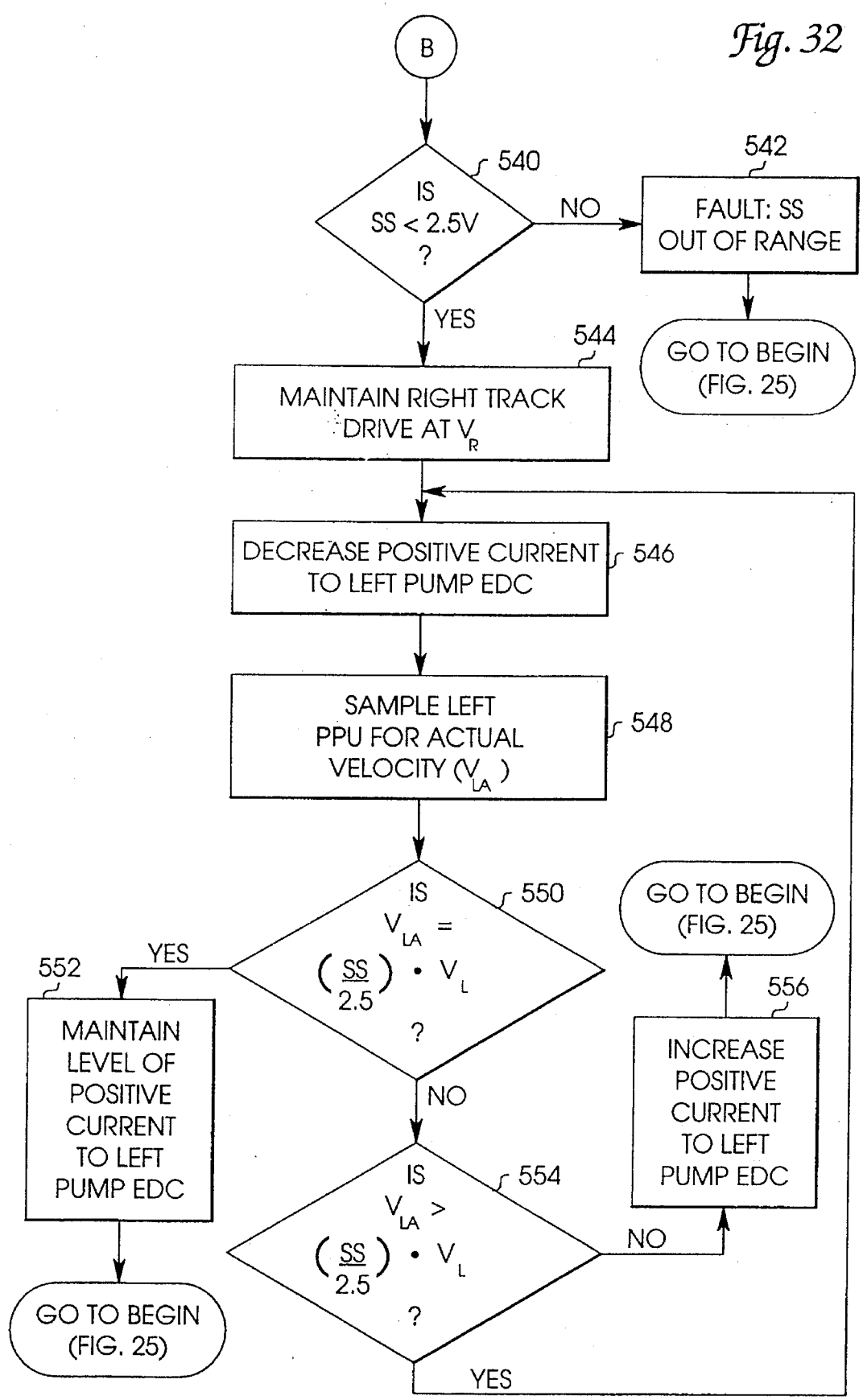
FIG. 32 illustrates a second part of a control process for effectuating steering of a track trencher operating in a trench mode in response to steering control signals produced by a novel multiple mode steering control.

An embodiment of a process by which the computer 182, in response to the steering signals produced by the steering control 92, effectuates steering changes of a track trencher 30 is provided in FIGS. 25–32. The multiple mode steering control 92 is preferably operable in a plurality of travel modes, and at least a transport mode and a trench mode. FIGS. 25–30 illustrate one embodiment of a steering control process for steering a track trencher 30 operating in a transport travel mode, while FIGS. 31 and 32 illustrate a steering control process for accomplishing steering when operating in a trench travel mode.

Figure 25:
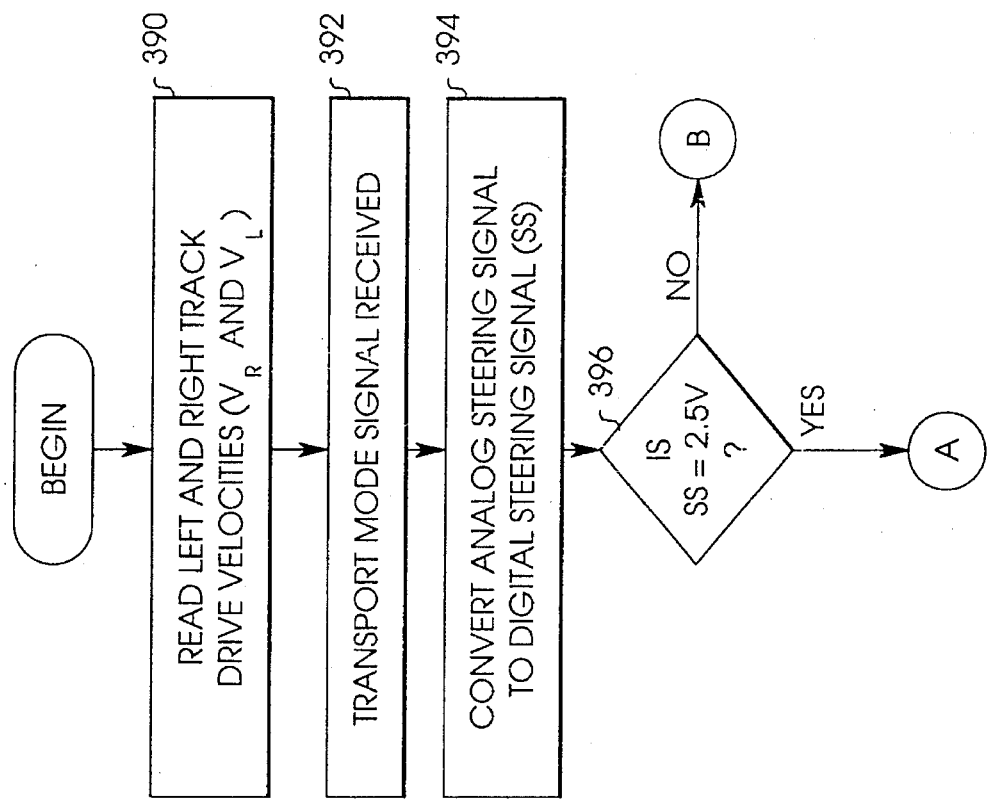
FIG. 25 illustrates a first part of a control process for effectuating steering of a track trencher operating in a transport node in response to steering control signals produced by a novel multiple mode steering control.
Figure 26:
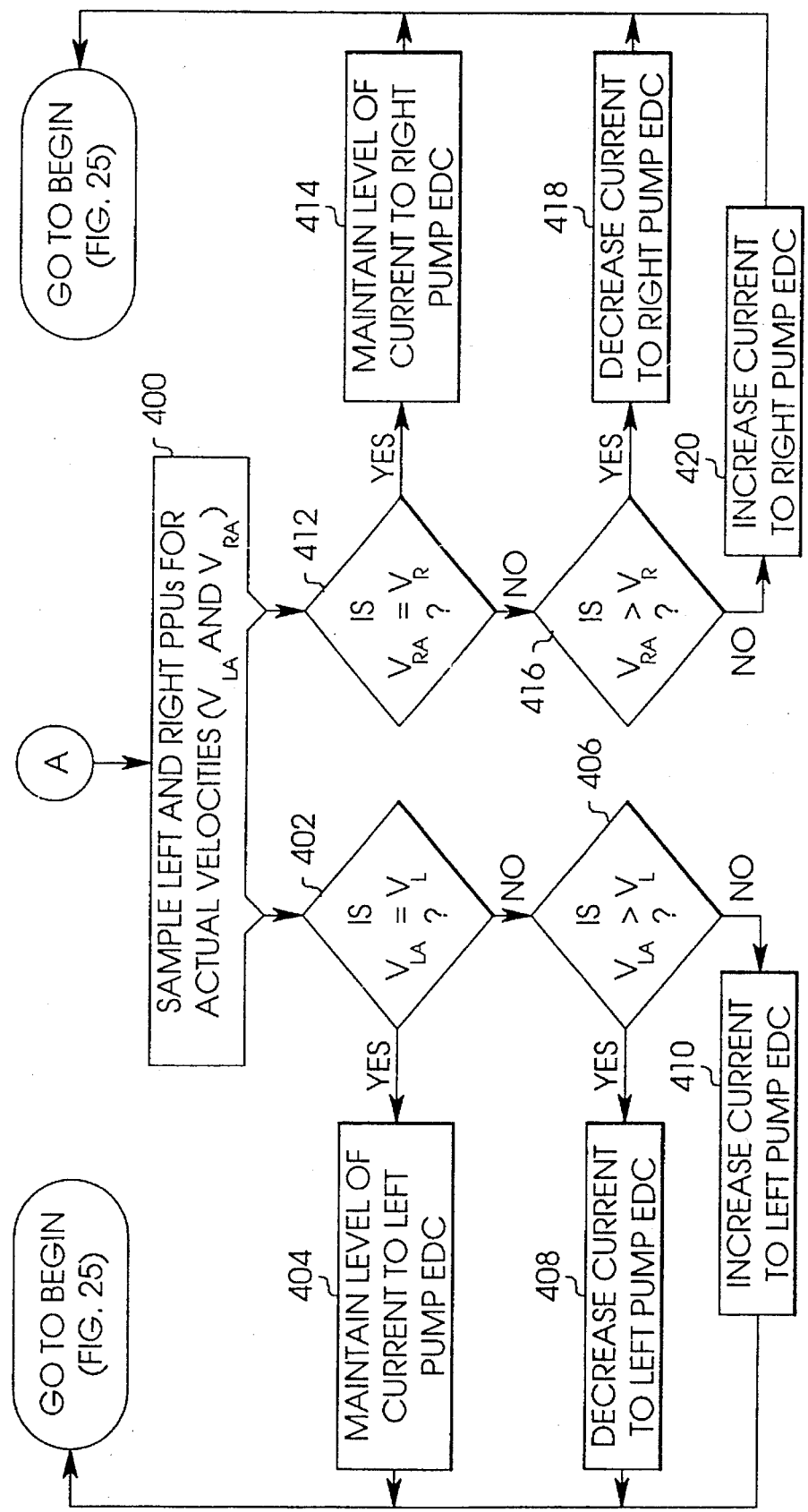
FIG. 26 illustrates a second part of a control process for effectuating steering of a track trencher operating in a transport mode in response to steering control signals produced by a novel multiple mode steering control.

As shown in FIGS. 25 and 26, the target left and right track motor 42 and 44 velocities ($V_R$ and $V_L$) are determined at step 390. The target track motor velocities $V_R$ and $V_L$ are preferably derived from the propel control signal received by the computer 182. Alternatively, an appropriate signal corresponding to a desired or selected propulsion level of the left and right track drives 34 and 32 may be used as a basis for computing the target left and right track motor 42 and 44 velocities $V_R$ and $V_L$ at step 390. Upon receiving a transport mode signal at step 392, the computer 182 converts the analog steering signal received from the steering control 92 to a digital steering signal at step 394.

If the steering signal is equivalent to 2.5 volts at step 396, the left and right PPUs 198 and 192 of the left and right track motors 42 and 44, respectively, are sampled and actual velocities of the left and right track motors 42 and 44 are determined ($V_{LA}$ and $V_{RA}$) at step 400. The actual left and right track motor velocities $V_{LA}$ and $V_{RA}$ are respectively compared to the target left and right track motor velocities $V_L$ and $V_R$ at steps 402 and 412. If the computed actual track motor velocities are equivalent to the target track motor velocities, the level of current delivered to the left and right pump 38 and 40 EDCs is held constant at steps 404 and 414. The control current delivered to the left and right pump EDCs is decreased at steps 408 and 418, respectively, if the actual track motor velocities $V_{LA}$ and $V_{RA}$ are greater than the target left and right track motor velocities $V_L$ and $V_R$. The control current is increased respectively to the left and right pump EDCs at steps 410 and 420 when the actual track motor velocities $V_{LA}$ and $V_{RA}$ are less than the target track motor velocities $V_L$ and $V_R$.

Figure 27:
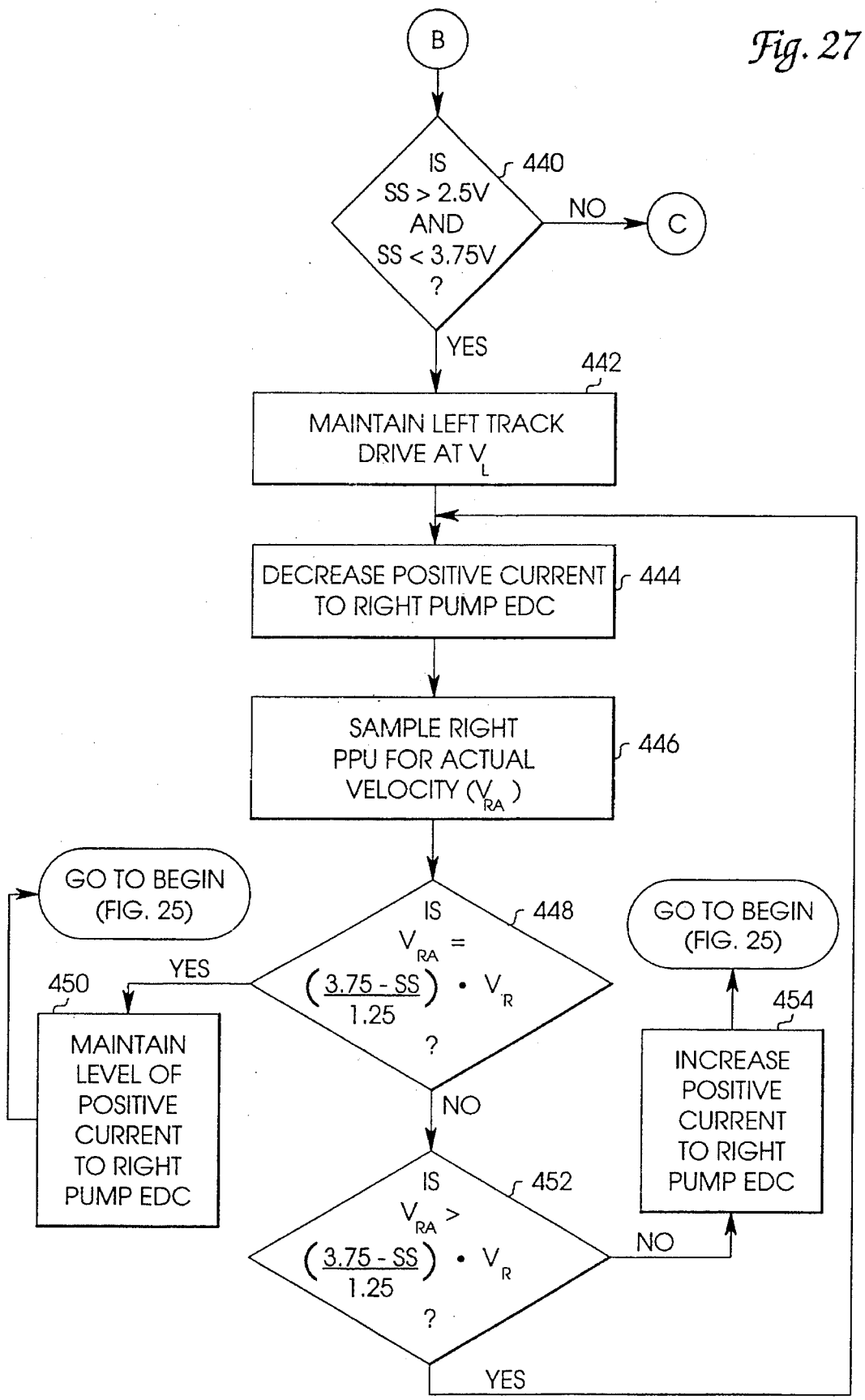
FIG. 27 illustrates a third part of a control process for effectuating steering of a track trencher operating in a transport node in response to steering control signals produced by a novel multiple mode steering control.

The control process shown in FIG. 27 further illustrates the novel steering characteristics of the steering control 92 when the steering control 92 is set between a zero setting 140 and a right transition setting 148 in order to effect a right turn. Between these settings, a steering control signal will preferably range between 2.5 volts and 3.75 volts. When a steering control signal is determined by the computer 182 to be within this range at step 440, the left track motor 42 is maintained at 100% of the target track motor velocity $V_L$ at step 442. To effect a right turn, the positive current delivered to the right pump 40 EDC is decreased at step 444, and the actual deceleration of the right track motor 44 is determined by sampling the right PPU at step 446. As discussed previously with respect to FIG. 14, the degree to which the right track motor 44 decelerates is preferably directly proportional to the steering signal produced by the steering control 92 between the ranges of 2.5 volts and 3.75 volts.

At step 448, for example, the computer 182 preferably computes a new target right track motor 44 velocity in response to the steering control 92 setting by multiplying the original right track motor velocity $V_R$ by a scaling factor. It is noted that the value of the scaling factor is preferably a function of the equation defining the characteristic steering curve 160 illustrated in FIG. 15, and reflects the percent change in the value of the steering control signal (SS) from a maximum at 2.5 volts to a minimum at 5.0 volts. If the actual right track motor velocity $V_{RA}$ is equivalent to the new target right track motor velocity computed at 448, the level of positive control current delivered to the right pump 44 EDC is maintained at step 450. If the actual right track motor velocity $V_{RA}$ is less than the new target right track motor velocity $V_R$, the positive current delivered to the right pump 44 EDC is increased at step 454, and, if the steering control 92 setting has not been changed, the right PPU is again sampled to determine the actual velocity $V_{RA}$ in response to the increased positive control current at step 446. The positive control current delivered to the right pump 44 EDC is decreased at step 444 in the event that the actual right track motor velocity $V_{RA}$ is greater than the new target right track motor velocity.

Figure 28:
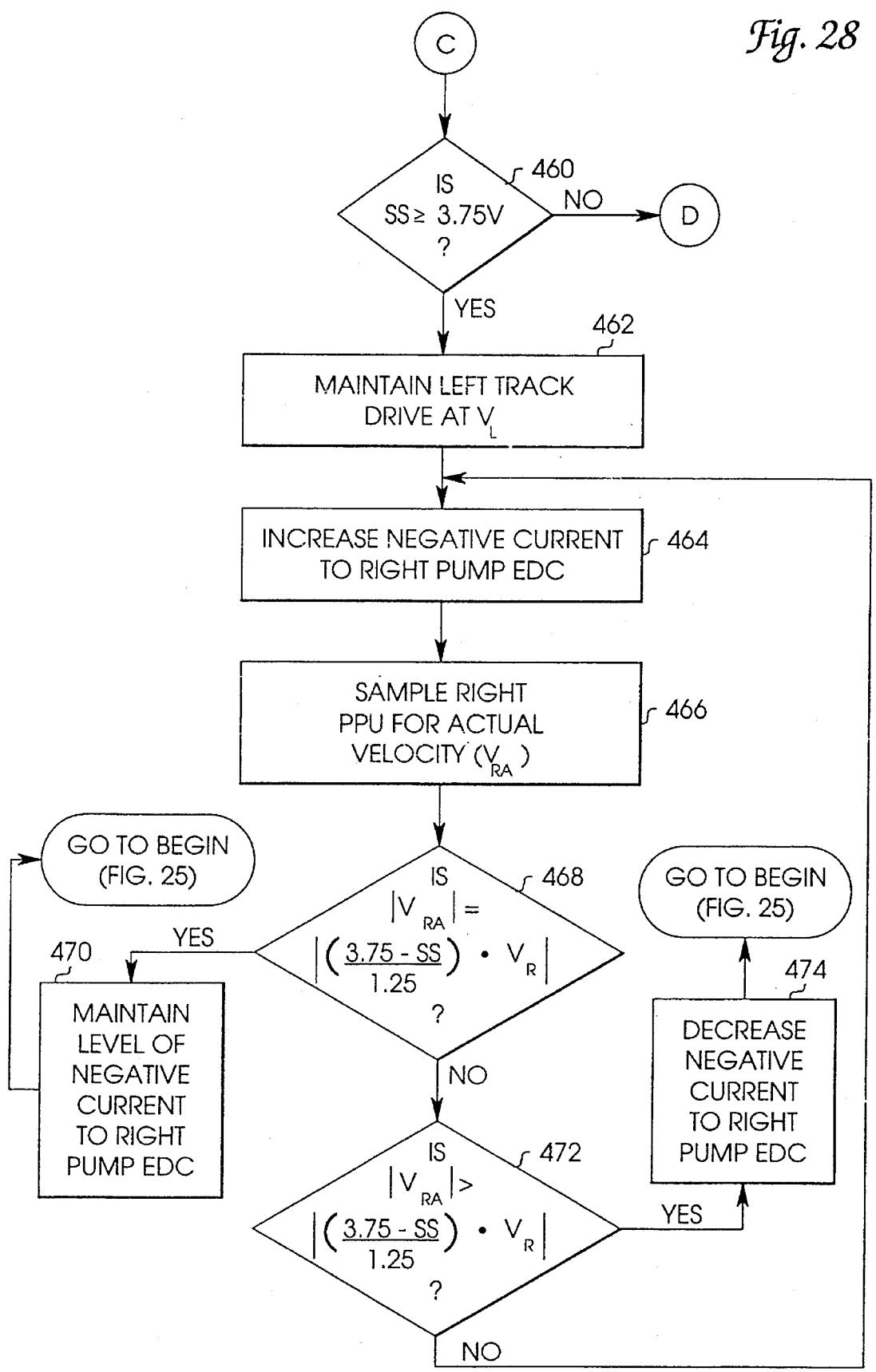
FIG. 28 illustrates a fourth part of a control process for effectuating steering of a track trencher operating in a transport mode in response to steering control signals produced by a novel multiple mode steering control.

Moving the steering control 92 further in a right direction beyond the right transition setting 148 causes the novel steering control system to employ counter-rotation steering for effectuating a right turn. Counter-rotation steering in a right direction is preferably associated with steering control 92 output signals between 3.75 volts and 5.0 volts, as shown in FIGS. 15 and 28. For steering control 92 signals within this range, the left track motor 42 is preferably maintained at 100% of full left track motor velocity $V_L$ at step 462. It is noted that the right track motor 44 is operated in a reverse direction with respect to the left track motor 42 for effectuating a right turn employing counter-rotation steering. As such, a negative current is applied to the right pump 40 EDC at step 464, causing the right track motor 44 to operate in a reverse direction. The actual right track motor 44 velocity, both magnitude and forward or reverse direction, $V_{RA}$ is determined by sampling the right track motor PPU sensor 192 at step 466.

The computer, at step 468, preferably computes a new target velocity for the right track motor 44 in response to the steering control 92 setting by multiplying the original right track motor velocity $V_R$ by a scaling factor. For clarity, the absolute values of the computed results are compared at step 468, although the computation of the relative difference between the actual and target right track motor velocities may be accomplished in an alternative manner. If the actual and new target right track velocities are equivalent, no modification is made to the level of negative control current delivered to the right pump EDC, as indicated at step 470. If the absolute value of the actual right track motor velocity $V_{RA}$ is greater than the absolute value of the new target right track motor velocity, the level of negative control current supplied to the right pump EDC is decreased at step 474. The computer 182 effectuates an increase in the negative control current delivered to the right pump EDC at step 464 when the absolute value of the actual right track motor velocity is less than the absolute value of the new target right track motor velocity.

FIGS. 29 and 30 illustrate a sequence of steering control process steps to effectuate left turning of a track trencher 30 while operating in a transport travel mode. The process by which turning and counter-rotation turning of a track trencher 30 in a left direction is accomplished is preferably substantially similar to that previously described with regard to accomplishing right turns as illustrated in FIGS. 27 and 28. The scaling factors and the equations to compute a new target left track motor velocity, however, are, of course, different from those for accomplishing right turns.

The multiple mode steering control 92 provides different functionality when steering a track trencher 30 in a trench travel mode. In one embodiment, as illustrated in FIGS. 14, 31, and 32, steering a track trencher 30 in a straight direction is associated with a steering control 92 signal of 2.5 volts, plus or minus a tolerance factor. The computer 182, at step 520, preferably associates steering control 92 signals in excess of 2.5 volts with steering a track trencher is a right direction. The left track motor 42 is maintained at 100% of the target velocity $V_L$ at step 522, and the positive control current supplied to the right pump EDC is decreased at step 524. The actual right track motor 44 velocity $V_{RA}$ is determined from sampling the right PPU sensor 192 at step 526, and compared to the new target right track motor 44 velocity at step 528. It is noted that a scaling factor, indicated at step 528 as ((5.0-SS)/2.5), is formulated from the equation of the line 160 describing a preferred relationship between the steering control 92 output signals and the associated change in the velocity of the right track motor 44.

The level of positive control current supplied to the right pump EDC is maintained at step 530 as long as the actual right track motor 44 velocity $V_{RA}$ is equivalent to the new target right track motor 44 velocity. The positive control current is either increased at step 534 or decreased at step 524 depending on the outcome of the comparison of the actual and new target right track motor velocities performed by the computer 182 at step 532. Steering at track trencher 30 in a left direction is accomplished in substantially the same manner as previously described with reference to the steering control process illustrated in FIG. 31. It is noted that counter-rotation steering is preferably unavailable when turning a track trencher 30 in a trench mode of operation. Thus, steering a track trencher 30 in a trench mode of travel is accomplished by decreasing the level of positive current supplied to the pump EDC of the appropriate track drive.

One significant advantage of the novel propulsion and steering control system illustrated in FIG. 17 concerns the manner in which operational information regarding the track trencher 30 is communicated to an operator. A display 100, shown in FIG. 7, is coupled to the computer 182, and preferably communicates messages indicative of operating status, diagnostic, calibration, fault, safety, and other related information to the operator. The display 100 provides quick, accurate, and easy-to-understand information to an operator by virtue of the interpretive power of the computer 182 which acquires and processes data from a plurality of track trencher sensors. As such, an operator need not mentally record, interpret, and assess the relative importance of a plurality of prior art analog display instrument readings in order to efficiently and safely operate a track trencher 30. Incorporating the display 100 into the control scheme and providing an operator with a plurality of immediately understandable informational messages dramatically and fundamentally alters the manner in which a track trencher 30 is operated.

The display 100 is preferably a liquid crystal display, although other suitable types of displays may be employed, such as a cathode ray tube. A message selection switch 99, proximate the display 100, provides means for selecting a plurality of informational messages, such as those shown in FIG. 18. Toggling the message selection switch 99 preferably results in displaying additional informational messages on the display 100.

Provided in FIG. 18 are several examples of the types of informational messages which can be communicated to the operator of a track trencher 30 when employing the display 100. Message 210, for example, indicates that the track trencher 30 is operating in a transport mode at a velocity of 98 FPM, with the speed range control 96 set to a low setting. The message 210 further indicates that the track trencher 30 is performing a left turn at 10% of the maximum left turning capability. The particular attachment 46 coupled to the track trencher 30 is indicated as a chain, a short form of the term ditcher chain 50. The ditcher chain 50 is currently inoperative as indicated by the 0% of full attachment 46 output. It should be appreciated that this information, particularly the speed and turning status information of the track trencher 30, was heretofore unavailable to the operator controlling a track trencher 30 using a prior art control panel 62. Instead, only crude estimates were figured by the skilled operator after monitoring and interpreting the state of various analog display instruments.

The informational status message 211 indicates that the track trencher 30 is currently operating in the low range of the trench mode and at a rate of 1.3 FPM. The ditcher chain 50 is indicated as currently operating at 72% of full attachment 46 output, and the track trencher 30 is straight tracking with no left or right turning component.

Various other status messages may be communicated to the operator, such as message 212, wherein the current engine speed is indicated as 2,200 RPM, the engine has been operated for a total elapsed operating time of 332.1 hours, and the battery is indicated at operating at 12.2 volts. It is to be understood that the status messages illustrated in FIG. 18 are provided for illustration only, and do not represent limitations on the nature of information communicated over the display 100.

In addition to status messages describing the state of various operational parameters of a track trencher 30, fault conditions resulting from anomalous operating conditions are also communicated to the operator over the display 100. Typically, a track trencher 30 employs a plurality of sensors in addition to those shown in FIG. 17. Other mechanical or electrical components comprising the track trencher 30 typically include one or more sensors for monitoring the operating condition of the particular component. The throttle 206 of the engine 36, for example, may include a throttle sensor which monitors the voltage or other parameter of the throttle control 206. A malfunction of the throttle control 206 may be communicated to the operator as a fault message 213 indicating that an unacceptable throttle sensor voltage signal has been detected.

A malfunctioning left track motor sensor 198 may be communicated as a fault message 214, wherein the left track PPU signal is lost or not currently being received by the computer 182. Other fault messages may be indicative of more severe anomalous operating conditions, such as excessively low oil pressure 215 or excessively high water or coolant temperature 216. Moreover, various instructional messages may be communicated to the operator when performing routine maintenance, repair, and calibration of the track trencher 30. Further, the display 100 is employed to provide a user-interactive environment which substantially enhances the operation and routine maintenance of the track trencher 30, and increases the quality and quantity of information communicated to the operator.

One important feature of novel display and control system concerns a safety feature by which the engine 36 is automatically shutdown when a severe anomalous operating condition is detected. Two such severe engine conditions are indicated by fault messages 215 and 216, wherein an excessively low oil pressure or an excessively high water temperature is detected. Upon detecting a severe anomalous operating condition, the computer 182 will preferably initiate an engine shutdown sequence in which the engine is automatically shutdown after a predetermined amount of time.

The warning messages 216 and 217, illustrated in FIG. 18, indicate that the engine will shutdown in 30 seconds due to detection of an excessively high water temperature, thereby giving the operator information with regard to both the amount of time remaining until the engine is shutdown, as well as the nature of the anomalous operating condition. The computer 182 preferably controls a fuel control 204 that regulates fuel to the engine 36. Upon termination of the engine shutdown sequence, indicated by the expiration of the allotted 30 seconds, the computer 182 instructs the fuel control 204 to discontinue delivering fuel to the engine 36, thus resulting in the shutdown of the engine 36.

Another important advantage concerns various features which enhance the operator's safety. In one embodiment, an operator's seat sensor 200, preferably installed in the operator's seat 54, is coupled to the computer 182. The operator's seat sensor 200 is preferably a normally closed switch, or other type of switch which monitors the presence of the operator on the operator's seat 54.

Alternatively, the sensor 200 may be adapted for sensing the presence of the operator within a predetermined area, such as an area designated for controlling the track trencher 30, and communicating a presence signal to the computer 182 whenever the operator leaves the predetermined area. A force sensor, for example, provided in a mat covering the floor portion of the predetermined control area, or a light beam presence detector may be suitable alternative means for monitoring the presence of an operator in the control area portion of a track trencher 30.

Upon receiving a presence signal from the operator's seat sensor 200, the computer 182 preferably communicates a disable control signal that interrupts or otherwise disables propulsion of the left and right track drives 34 and 32. It is noted that the interruption of propulsion to the track drives 34 and 32 may be accomplished by shutting down the engine 36. Preferably, the engine 36 remains operating when the computer 182 receives a presence signal, with the power delivered to the track drives 34 and 32 being interrupted or disabled. As such, stress on the engine 36 is dramatically reduced over time. The status of such an interruption is preferably communicated to an operator over the display 100, as well as instructional messages as to the proper steps to continue with normal track trencher 30 operation.

In one embodiment, normal operation of the track trencher 30 ensues when the operator returns to the operator's seat 54 within a predetermined amount of time after the seat sensor 200 initially produces a presence signal. For example, should the operator leave the operator's seat 54 but return to the seat 54 within six seconds, propulsion of the left and right track drives 34 and 32 is unaffected. In addition to disabling the left and right track drives 34 and 32, the computer 182, upon receiving a presence signal, preferably interrupts all attachment 46 activity.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A system for operating a track trencher including an engine coupled to left and right track drives, the system comprising:

means for producing a travel mode signal indicative of one of a plurality of track trencher travel modes;

a propulsion control, operative in one of a plurality of distinct operating modes in response to the travel mode signal, for producing a propel signal associated with one of the plurality of track trencher travel modes; and computer control means for controlling propulsion of the left and right track drives in one of the plurality of track trencher travel modes to effect propulsion changes in response to the propel signal.

2. A system as claimed in claim 1, wherein the propulsion control comprises a lever operable in a range of forward and reverse settings, and means for producing the propel signal being proportional to displacement of the propel lever within the forward and reverse range of settings.

3. A system as claimed in claim 1, wherein the travel mode signal producing means comprises means for producing a transport mode signal, and the propulsion control comprises means, operable in a range of forward and reverse settings, for producing a transport propel signal representative of a left and right track drive target velocity in response to the transport mode signal.

4. A system as claimed in claim 3, wherein the left and right track drives respectively comprise left and right track pumps, and the computer control means comprises means for modifying the output level of the left and right track pumps to respectively maintain the left and right track drives at the left and right track drive target velocity in response to the transport propel signal.

5. A system as claimed in claim 1, wherein the travel mode signal producing means comprises means for producing a trench mode signal, and the propulsion control comprises means for producing a trench propel signal representative of a target engine output level in response the trench mode signal.

6. A system as claimed in claim 5, wherein the computer control means comprises means for controlling propulsion of the left and right track drives to maintain the engine at the target engine output level.

7. A system as claimed in claim 5, wherein the computer control means comprises means for modifying the trench propel signal to control propulsion of the left and right track drives to maintain the engine at the target engine output level.

8. A system as claimed in claim 1, wherein the propulsion control comprises a propel control lever having a range of forward and reverse settings, the propulsion control comprising means for producing a trench mode signal representative of a target engine output level in response to the propel control lever being set at a maximum forward setting.

9. A system as claimed in claim 8, wherein the maximum forward setting of the propel control lever is modifiable to an adjusted maximum forward setting, the propulsion control comprising means for producing a trench mode signal representative of an adjusted target engine output level in response to the propel control lever being set to the adjusted maximum forward setting.

10. A system as claimed in claim 8, wherein the computer control means comprises means for modifying the trench propel signal to be representative of an adjusted maximum forward setting of the propel control, the modified trench propel signal being representative of an adjusted target engine output level.

11. A track trencher propulsion system, comprising:

a track trencher including a left track drive, a right track drive, and an engine coupled to the left and right track drives;

a computer;

a travel mode selection control coupled to the computer and selectable between a transport mode setting and a trench mode setting, the travel mode selection control producing a transport mode signal when the transport mode setting is selected and a trench mode signal when the trench mode setting is selected; and a propel control coupled to the computer and operable in a transport propulsion mode and in a trench propulsion mode, the propel control comprising means for producing a transport propel signal representative of a left and right track drive target velocity when the transport mode setting is selected, and for producing a trench propel signal representative of a target engine output level when the trench mode setting is selected; wherein the computer, coupled to the propulsion control means, moderates propulsion of the left and right track drives in response to the propel signal associated with one of the plurality of propel modes.

12. A system as claimed in claim 11, wherein the propel control comprises a lever having a grip portion and a base portion, the base portion including means for transducing displacement of the lever when moving the lever between a neutral setting and a range of forward and reverse settings.

13. A system as claimed in claim 11, wherein the travel mode selection control comprises throttle control means, coupled to the engine, for producing the transport mode signal and the trench mode signal.

14. A system as claimed in claim 11, wherein:

the travel mode selection control comprises a throttle control;

the throttle control comprises means for sensing fuel delivered to the engine at a maximum throttle control setting and at a throttle control setting other than the maximum throttle control setting; and the computer comprises means for producing the trench mode signal in response to the throttle sensing means sensing a maximum throttle control setting, and the transport mode signal in response to the throttle sensing means sensing a throttle control setting other than the maximum throttle control setting.

15. A system as claimed in claim 11, further comprising speed range selection means for selecting between a plurality of speed ranges, wherein the propel control comprises means, responsive to the speed range selection means, for producing a propel signal representative of a left and right track drive target velocity within a selected speed range.

16. A system as claimed in claim 11, wherein the propel control comprises means, operable in a range of forward and reverse settings, for producing the transport propel signal respectively representative of a forward and reverse left and right track drive target velocity.

17. A system as claimed in claim 11, wherein the left and right track drives respectively comprise left and right track pumps, and the computer comprises means for modifying the output of the left and right track pumps in response to the transport propel signal to respectively maintain the left and right track drives at the left and right track drive target velocity.

18. A system as claimed in claim 11, wherein the propel control comprises means for producing the transport propel signal representative of the left and right track drive target velocity measurable in revolutions-per-minute, and for producing the trench propel signal representative of the target engine output level measurable in revolutions-per-minute.

19. A system as claimed in claim 18, wherein the computer comprises means for controlling propulsion of the left and right track drives in response to the trench mode signal to maintain the engine at the target engine output level.

20. A method for operating a track trencher having an engine coupled to a left and a right track drive including the steps of:

producing one each of a transport travel mode signal and a trench travel mode signal indicative of a respective one of a transport and trench mode of track trencher travel;

producing a transport propel signal in response to the transport travel mode signal and a trench propel signal in response to the trench travel mode signal;

maintaining the left and right track drives at a target velocity in response to the transport propel signal; and maintaining the engine at a target engine output level in response to the trench propel signal.

21. A method as claimed in claim 20, wherein:

the step of maintaining the left and right track drives at the target velocity includes the steps of:

computing the target velocity using the transport propel signal;

comparing the target velocity to an actual velocity computed for the left and right track drives; and modifying the actual velocity of the left and right track drives to substantially correspond to the target velocity; and the step of maintaining the engine at the target engine output level includes the steps of:

computing the target engine output level using the trench propel signal;

comparing the target engine output level to a computed actual engine output level; and modifying the actual engine output level to substantially correspond to the target engine output level.

22. A method as claimed in claim 20, wherein:

the left and right track drives respectively comprise left and right track pumps;

the step of maintaining the left and right track drives at the target velocity includes the step of modifying the output of the left and right track pumps to respectively maintain the left and right track drives at the target velocity in response to the transport propel signal; and the step of maintaining the engine at the target engine output level includes the step of modifying the output of the left and right track pumps to maintain the engine at the target engine output level in response to the trench propel signal.

* * * * *